(12) United States Patent
Liu et al.

(10) Patent No.: US 9,407,607 B2
(45) Date of Patent: Aug. 2, 2016

(54) METHOD FOR VIRTUAL PRIVATE CLOUD TO ACCESS NETWORK, NETWORK SIDE DEVICE AND DATA CENTER DEVICE

(71) Applicant: HUAWEI TECHNOLOGIES CO., LTD., Shenzhen (CN)

(72) Inventors: Ying Liu, Shenzhen (CN); Delei Yu, Beijing (CN); Shihui Hu, Beijing (CN); Fengkai Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 14/149,221

(22) Filed: Jan. 7, 2014

(65) Prior Publication Data

US 2014/0123270 A1   May 1, 2014

Related U.S. Application Data

(63) Continuation of application No. PCT/CN2012/078179, filed on Jul. 4, 2012.

(30) Foreign Application Priority Data

Jul. 12, 2011   (CN) .......................... 2011 1 0194570

(51) Int. Cl.
G06F 15/16 (2006.01)
H04L 29/06 (2006.01)
H04L 12/46 (2006.01)

(52) U.S. Cl.
CPC .......... *H04L 63/0272* (2013.01); *H04L 12/467* (2013.01)

(58) Field of Classification Search
CPC .......................... H04L 63/0272; H04L 12/467
USPC ........................................................... 726/15
See application file for complete search history.

(56) References Cited

U.S. PATENT DOCUMENTS 8,230,050 B1 * 7/2012 Brandwine ........... H04L 45/586
                                                709/220
2011/0075674 A1   3/2011   Li et al.

FOREIGN PATENT DOCUMENTS

CN      101841451     9/2010
CN      101986274     3/2011

(Continued)

OTHER PUBLICATIONS

Extended and Supplementary European Search Report issued on Oct. 28, 2014 in corresponding European Patent Application No. 12811028.5.

(Continued)

*Primary Examiner* — Baotran N To
(74) *Attorney, Agent, or Firm* — Staas & Halsey LLP

(57) ABSTRACT

The present invention provides a method for a virtual private cloud to access a network, a network side device and a data center device. When receiving a VPC configuration resource provided by a user, the network side device and the data center device exchange information, create a VPC, determine a PE interface address, a VCE uplink port address, an access tunnel and a VCE downlink port address for the VPC, and perform a corresponding configuration operation, thereby enabling the VPC to access a VPN in a basic bearer network without the need of uniform management of a control system, so as to solve a problem that the VPC cannot access the network when the basic bearer network and a data center belong to different operators, and meanwhile, save a device resource.

4 Claims, 13 Drawing Sheets

(56) References Cited

FOREIGN PATENT DOCUMENTS

| CN | 102096596 | 6/2011 |
|---|---|---|
| WO | WO 2010/068618 A1 | 6/2010 |
| WO | 2011/041101 | 4/2011 |

OTHER PUBLICATIONS

"Amazon Virtual Private Cloud: Getting Started Guide", API Version, Amazon Web Services, Jul. 15, 2009, 56 Pages.

"Amazon Virtual Private Cloud: Network Administrator Guide", API Version, Amazon Web Services, Jul. 15, 2009, 50 Pages.

"Amazon Virtual Private Cloud: Developer Guide", API Version, Amazon Web Services, Jul. 15, 2009, 50 Pages.

International Search Report mailed Nov. 1, 2012 in corresponding International Application No. PCT/CN2012/078179.

"Amazon Virtual Private Cloud Getting Started Guide (API Version Nov. 15, 2010)," Amazon Web Services™, Last updated Dec. 15, 2010, pp. 1-38 & 3 cover pages.

Office Action, dated Jul. 24, 2015, in corresponding Chinese Application No. 201110194570.5 (6 pp.).

* cited by examiner

US 9,407,607 B2

METHOD FOR VIRTUAL PRIVATE CLOUD TO ACCESS NETWORK, NETWORK SIDE DEVICE AND DATA CENTER DEVICE

CROSS-REFERENCE TO RELATED APPLICATIONS

This application is a continuation of International Application No. PCT/CN2012/078179, filed on Jul. 4, 2012, which claims priority to Chinese Patent Application No. 201110194570.5, filed on Jul. 12, 2011, both of which are hereby incorporated by reference in their entireties.

TECHNICAL FIELD

Embodiments of the present invention relate to the field of network technologies, and in particular, to a method for a virtual private cloud to access a network, a network side device and a data center device.

BACKGROUND

Cloud computing is a network application mode, is the development of distributed processing, parallel processing and grid computing, and is to divide an enormous computing processing program into numerous smaller subprograms through a network, and then to return a processing result to a user after computing and analyzing are performed by an enormous system formed by multiple servers.

With the prevalence of a data center, an enterprise may apply for a resource at the data center, and the data center provides a cloud computing service for the enterprise. A series of resources such as hardware, software and a network individually built by the data center for one enterprise may be collectively referred to as a virtual private cloud (Virtual Private Cloud, VPC for short).

After establishing a virtual private cloud at the data center, the enterprise needs to enable the virtual private cloud to access a network, so that a user can access. The user accesses the virtual private cloud generally by establishing a temporary and secure connection through a basic bearer network, namely, establishing a virtual private network (Virtual Private Network, VPN for short).

In an existing method for a virtual private cloud to access a network, generally the virtual private cloud accesses a certain VPN of the network as a VPN site, so that a user already accessing the VPN can access the virtual private cloud. However, this method is uniformly managed by a control system, and is to create the virtual private cloud and the VPN at the data center and a network side respectively, and establish a connection link. The data center and the basic bearer network need to belong to a same operator. When the data center and the basic bearer network belong to different operators, adopting the existing method cannot enable the virtual private cloud to access the network.

SUMMARY

In view of this, embodiments of the present invention provide a method for a virtual private cloud to access a network, a network side device and a data center device, which are used to solve a problem in the prior art that a virtual private cloud cannot access a network when a data center and a basic bearer network belong to different operators.

To achieve the foregoing objective, the present invention provides the following technical solutions:

In one aspect of the present invention, a method for a virtual private cloud to access a network is provided, where the method includes:
 receiving a virtual private cloud VPC initial creation request sent by a user, determining, according to a data center identifier carried in the request, a service provider network edge router PE used for access of a virtual customer network edge device VCE at a network side, determining an interface address for the PE and determining an uplink port address for the VCE from a virtual private network VPN configuration resource provided by the user, and allocating an access tunnel for the VCE to access the PE;
 sending the uplink port address, access tunnel information and a VPC configuration resource carried in the VPC initial creation request to a data center device through a VPC creation request, where the VPC creation request is used for instructing the data center device to create a VPC and a VCE, determine a downlink port address for the VCE according to the VPC configuration resource, and configure the uplink port address, the downlink port address and the access tunnel information to the VCE; and
 configuring the PE interface address and the access tunnel information to the determined PE used for access of the VCE, so that the VCE accesses the PE, thereby enabling the created VPC to access the VPN.

In another aspect of the present invention, a method for a virtual private cloud to access a network is provided, where the method includes:
 creating a VPC and a VCE when receiving a VPC creation request sent by a network side device, where the VPC creation request is sent after the network side device receives a VPC initial creation request sent by a user, determines, according to a data center identifier carried in the VPC initial creation request, a PE used for access of the VCE at a network side, determines an interface address for the PE and determines an uplink port address for the VCE from a VPN configuration resource provided by the user, and allocates an access tunnel for the VCE to access the PE;
 determining a downlink port address for the VCE according to a VPC configuration resource carried in the VPC creation request, where the VPC configuration resource is carried in the VPC initial creation request; and
 configuring the downlink port address, and the uplink port address and access tunnel information that are carried in the VPC creation request to the VCE, so that after the network side device configures the PE interface address and the access tunnel information to the determined PE used for access of the VCE, the VCE accesses the PE, thereby enabling the created VPC to access the VPN.

In another aspect of the present invention, a method for a virtual private cloud to access a network is provided, where the method includes:
 creating a VPC and a VCE after receiving a VPC initial access request sent by a user, and determining a downlink port address for the VCE according to a VPC configuration resource carried in the request;
 sending a data center identifier to a network side device through a VPC access request, where the VPC access request is used for instructing the network side device to determine, according to the data center identifier, a PE used for access of the VCE at a network side, determine an interface address for the PE and determine an uplink port address for the VCE from a VPN configuration resource provided by the user through a data center device, allocate an access tunnel for the VCE to access the PE, and configure the PE interface address and access tunnel information to the determined PE used for access of the VCE; and configuring the uplink port address, the downlink port address and the access tunnel information to the VCE after receiving the uplink port address and the access tunnel information that are sent by the network side device, so that the VCE accesses the PE, thereby enabling the created VPC to access the VPN.

In another aspect of the present invention, a method for a virtual private cloud to access a network is provided, where the method includes:

receiving a VPC access request sent by a data center device, where the VPC access request is sent after the data center device receives a VPC initial access request sent by a user, creates a VPC and a VCE, and determines a downlink port address for the VCE according to a VPC configuration resource carried in the request;

determining, according to a data center identifier carried in the VPC access request, a PE used for access of the VCE at a network side, determining an interface address for the PE and determining an uplink port address for the VCE from a VPN configuration resource provided by the user through a data center, and allocating an access tunnel for the VCE to access the PE;

configuring the PE interface address and access tunnel information to the determined PE used for access of the VCE; and sending the uplink port address and the access tunnel information to the data center device, so that the data center device configures the uplink port address, the downlink port address and the access tunnel information to the VCE, and the VCE accesses the PE, thereby enabling the created VPC to access the VPN.

In another aspect of the present invention, a network side device is provided, where the device includes:

a first receiving module, configured to receive a VPC initial creation request provided by a user;

a first resource allocating module, configured to determine, according to a data center identifier carried in the VPC initial creation request, a PE used for access of a VCE at a network side, determine an interface address for the PE and determine an uplink port address for the VCE from a VPN configuration resource provided by the user, and allocate an access tunnel for the VCE to access the PE;

a request sending module, configured to send a VPC creation request to a data center device, where the VPC creation request carries the uplink port address, access tunnel information and a VPC configuration resource carried in the VPC initial creation request; and a PE configuring module, configured to configure the PE interface address and the access tunnel information to the determined PE used for access of the VCE.

In another aspect of the present invention, a data center device is provided, where the device includes:

a request receiving module, configured to receive a VPC creation request sent by a network side device, where the VPC creation request carries an uplink port address and access tunnel information that are allocated by the network side device and a VPC configuration parameter carried in a VPC initial access request;

a first creating module, configured to create a VPC and a VCE after the VPC creation request is received;

a first address allocating module, configured to determine a downlink port address for the VCE according to a VPN configuration resource carried in the VPC creation request; and a VCE configuring module, configured to configure the uplink port address, the access tunnel information and the downlink port address to the VCE.

In another aspect of the present invention, a data center device is provided and includes:

an information receiving module, configured to receive a VPC initial access request sent by a user;

a second creating module, configured to create a VPC and a VCE after the VPC initial access request is received;

a second address allocating module, configured to allocate a downlink port address for the VCE according to a VPC configuration resource carried in the VPC initial access request;

an information sending module, configured to send a VPC access request to a network side device, where the VPC access request carries a data center identifier;

a resource receiving module, configured to receive an uplink port address and access tunnel information that are sent by the network side device; and a VCE configuring module, configured to configure the uplink port address, the downlink port address and the access tunnel information to the VCE.

In another aspect of the present invention, a network side device is provided, where the device includes:

a second receiving module, configured to receive a VPC access request sent by a data center device;

a second resource allocating module, configured to determine, according to a data center identifier carried in the VPC access request, a PE used for access of a VCE at a network side, determine an interface address for the PE and determine an uplink port address for the VCE from a VPN creation resource provided by a user through a data center, and allocate an access tunnel for the VCE to access the PE;

a PE configuring module, configured to configure the PE interface address and access tunnel information to the determined PE used for access of the VCE; and a resource sending module, configured to send the uplink port address and the access tunnel information to the data center device.

It can be known from the foregoing technical solutions that, compared with the prior art, the embodiments of the present invention provide a method for a virtual private cloud to access a network, a network side device and a data center device. When receiving a VPC configuration resource provided by a user, a network side device and a data center device exchange information, create a VPC, allocate a PE interface address, a VCE uplink port address, an access tunnel and a downlink port address for the VPC, and perform a corresponding configuration operation, thereby enabling the VPC to access a VPN in a basic bearer network without the need of uniform management of a control system, so as to solve a problem that the VPC cannot access the network when the basic bearer network and a data center belong to different operators, and meanwhile, save a device resource.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely embodiments of the present invention, and persons of ordinary skill in the art may still derive other drawings according to these accompanying drawings without creative efforts.

DESCRIPTION OF EMBODIMENTS

The technical solutions in the embodiments of the present invention are clearly and completely described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

The embodiments of the present invention disclose a method for a virtual private cloud to access a network, a network side device and a data center device. A user provides a VPC configuration resource, a network side device and a data center device exchange information, create a VPC, determine access resources such as a PE interface address, a VCE uplink port address, an access tunnel and a downlink port address for the VPC, and respectively configure these access resources to a PE used for access of a VCE and the VCE, thereby enabling the VPC to access a VPN in a basic bearer network in a form of a VPN site without the need of uniform management of a control system, so as to solve a problem that the VPC cannot access the network when the basic bearer network and a data center belong to different operators, and meanwhile, save a device resource.

The technical solutions of the present invention are described in detail in the following with reference to the accompanying drawings.

Figure 1:
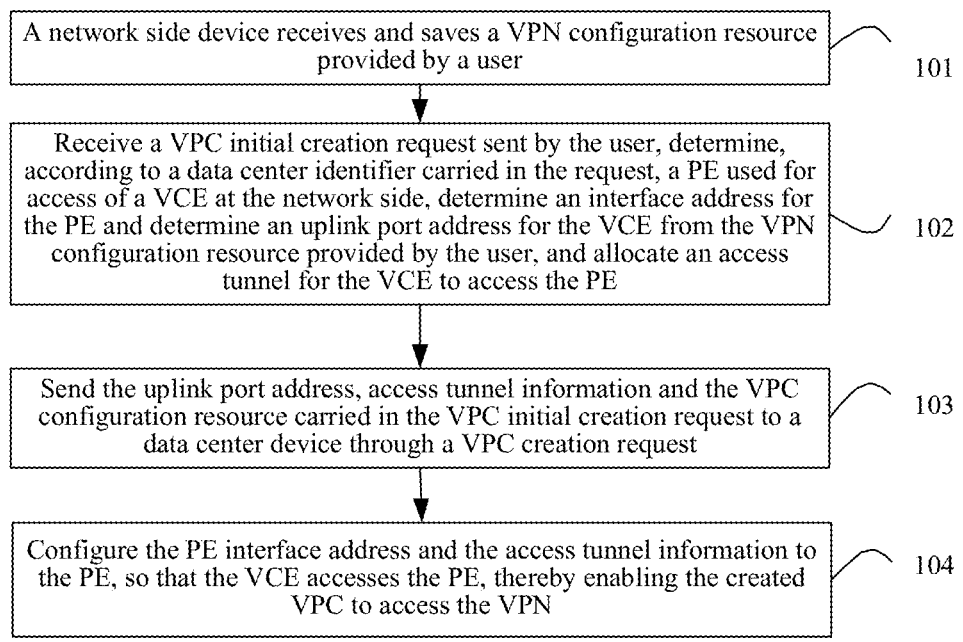
FIG. 1 is a flow chart of Embodiment 1 of a method for a virtual private cloud to access a network according to the present invention.

FIG. 1 is a flow chart of Embodiment 1 of a method for a virtual private cloud to access a network according to the present invention, where the method may include:

Step 101: A network side device receives and saves a VPN configuration resource provided by a user.

Before a VPC is created, the user provides, according to a certain VPN that the user hopes to join, a configuration resource of the VPN in advance through a web interface of the network side device.

The VPN configuration resource includes at least a VPN name, the number of VPN access sites and an Internet protocol (Internet Protocol, IP for short) address segment of a VPN access site. The VPN name refers to a name of a certain VPN that the user hopes to join, for example, Test.VPN, or an identifier symbol used for distinguishing a VPN from other VPNs. The number of VPN access sites corresponds to the number of IP address segments of the VPN access sites, and the number of sites should be provided with the corresponding number of IP address segments. When the IP address segment is occupied, marking may be performed.

For example, if 5 sites is allowed to access a certain VPN, 5 IP address segments should be provided. When there is a site accessing the VPN, an available IP address segment, that is, an unmarked IP address segment are selected from the 5 IP address segments, and then an IP address is respectively selected from the IP address segments and is allocated to a service provider network edge router (Provider Edge, PE for short) and a CE customer network edge device (Customer Edge, CE for short). The PE refers to a router of a basic bearer network, and the CE may refer to a router or a switch of a user site. When the PE and the CE belong to a same address segment, a connection may be established.

Sites accessing a same VPN may implement access to each other. In the embodiment of the present invention, a created VPC joins a certain VPN of a network in a form of a VPN site, thereby implementing that other sites may access the VPC.

Because there are multiple sites that may join the VPN, the PE maintains each site through a VPN instance, and the VPN instance refers to a virtual routing forwarding table (Virtual Routing Forwarding, VRF for short). Each site has, on the PE, a VPN instance corresponding to the site, namely each connection between the PE and the CE corresponds to a VPN instance. Therefore, after receiving the VPN configuration resource, a network side needs to allocate a route-distinguisher (Route-Distinguisher, RD for short) and a route-target (Route-Target, RT for short) for the VPN, and the RD and the RT are used for creating a VPN instance.

The network side device saves the VPN configuration resource, and for details about saved content, reference may be made to Table 1.

TABLE 1

| VPN Name | RD and RT Identifiers | VPN IP Address Segment | IP Address Segment Use Mark |
|---|---|---|---|
| Test.VPN or integer | 100:1, 100:1 | 172.16.1.0/24 | 0 (0 indicates unoccupied and 1 indicates occupied) |
| | | 172.16.2.0/24 | 0 |
| | | 172.16.3.0/24 | 0 |

It can be seen from Table 1 that, the VPN provides three address segments and three sites are allowed to access the VPN. After accessing the VPN, the three sites may access each other. When a certain address segment is occupied, it is marked as 1, and when a certain address segment is unoccupied, it is marked as 0.

Step 102: Receive a VPC initial creation request sent by the user, determine, according to a data center identifier carried in the request, a PE used for access of a virtual customer network edge device (Virtual Customer Edge, VCE for short) at the network side, determine an interface address for the PE and determine an uplink port address for the VCE from the VPN configuration resource provided by the user, and allocate an access tunnel for the VCE to access the PE.

In this embodiment, the VPC accesses the VPN in a form of a VPN site, so the VCE refers to a virtual CE created for the VPC.

The user submits the VPC initial creation request through a web interface of the network side device, for example, by clicking a related link of a page, or directly inputting and submitting related information.

Because there may be multiple data centers, the network side device saves correspondence between the PE and the data center in advance, and for the correspondence, reference may be made to Table 2.

TABLE 2

| DC Identifier | PE Identifier | PE Physical Interface |
|---|---|---|
| ABC.DC or integer | 192.168.1.172 | G1/0/0 |

A data center (Data Center, DC for short) identifier indicates a certain specific data center, may be a name of the data center, for example, ABC.DC, or an identifier symbol used for distinguishing a data center from other data centers, for example, may be an integer. A PE identifier is a physical address of the PE, the PE includes multiple physical interfaces, and each physical interface may correspond to a data center. The physical interface may be further divided into multiple subinterfaces, and each subinterface may connect to an application device of the data center.

Therefore, the PE used for access of the VCE may be determined according to the data center identifier.

In this implementation, the VPC initial creation request includes at least a data center identifier, a VPC configuration resource and a name of a VPN to be joined, and may further include information such as a VPC access bandwidth and a routing protocol parameter. The VPN configuration resource includes at least a VPC name and a VPC address segment. According to different requirements of the user, the VPC configuration parameter may further include the number of subnets in the VPC and a network segment of each subnet.

The network side device determines a PE interface address, a VCE uplink port address and an access tunnel for the VCE to access the PE, which may specifically be: searching for a saved corresponding VPN configuration resource according to a VPN name, selecting an unoccupied address segment from a VPN address segment in the VPN configuration resource, selecting two addresses from the address segment, respectively allocating the two addresses to a PE interface and a VCE uplink port, and allocating the access tunnel for the VCE to access the PE. The VCE uplink port refers to an interface that may be uplinked to a PE.

The determining the PE used for access of the VCE refers to determining a certain subinterface of a physical interface of the PE to which the VCE may connect. The determined PE interface address refers to an address of the subinterface, and the allocated access tunnel refers to access link information allocated for the subinterface of the PE, which may specifically be a virtual local area network identifier (Virtual Local Area Network Identifier, Vlan id for short).

Step 103: Send the uplink port address, the access tunnel and the VPC configuration resource carried in the VPC initial creation request to a data center device through a VPC creation request.

The VPC creation request is used for instructing the data center device to create a VPC and a VCE, determine a downlink port address for the VCE according to the VPC configuration resource, and configure the uplink port address, the downlink port address and access tunnel information to the VCE. The network side device sends, according to the data center identifier, the VPC creation request to a data center device corresponding to the data center identifier, where the VPC creation request may include the uplink port address and the access tunnel that are determined by the network side device and the VPC configuration resource, the access bandwidth and the routing protocol parameter that are carried in the VPC initial creation request.

After receiving the VPC creation request, the data center device creates a VPC and a VCE, determines an address of a VCE downlink port according to a VPC address segment in the VPC configuration resource, and then configures the uplink port address, the downlink port address and the access tunnel to the VCE. If the created VPC includes multiple subnets according to a requirement of the user, the data center device reallocates, for each subnet, an access tunnel that may access the VCE, which, for example, may be a Vlan id.

In this embodiment, because the VPC is a created virtual network resource, a hardware device, such as a router and a switch, may be further virtualized according to different requirements in the VPC. Because the VCE downlink port address is in the VPC address segment, the device in the VPC may also connect to the VPN through the VCE.

When creating the VPC, the data center device may further allocate a VPC identifier for the VPC. Because the data center may include multiple created virtual resources, the VPC identifier is used for distinguishing between different VPCs in the data center, the VPC identifier may be indicated by using a simple number, such as 1, 2, 3, . . . , and each VPC identifier is unique in the data center. The VCE created by the data center device may be created according to a physical resource of the data center itself, or created according to a VCE configuration requirement provided by the user, where the configuration requirement may include requirements for a memory, a CPU and a hard disk of the virtual device.

It should be noted that, when the VPC initial creation request sent by the user further includes a routing protocol parameter and an access bandwidth, the network side device sends the routing protocol parameter and the access bandwidth to the data center device through the VPC creation request, and the data center device configures the uplink port address, the downlink port address and the access tunnel to the VCE, and meanwhile, further configures a routing protocol according to the routing protocol parameter and configures an access bandwidth. The routing protocol refers to an executable routing protocol of the PE and the VCE, for example, may be an external border gateway protocol (External Border Gateway Protocol, EBGP for short), or an internal border gateway protocol (Internal Border Gateway Protocol, IBGP for short). After the routing protocol is configured, information transmission may be performed. The configuration refers to a process of delivering a resource, so that the resource may be used or run.

Step 104: Configure the PE interface address and the access tunnel information to the determined PE used for access of the VCE, so that the VCE accesses the PE, thereby enabling the created VPC to access the VPN.

The network side device configures the PE interface address and the access tunnel information to the determined PE used for access of the VCE. The PE interface address and the VCE uplink port address are in a same address segment of the VPN, so the PE and the VCE may establish a connection; and the VCE downlink port address is in the created VPC address segment, so the VPC may be used as a VPN site to access the VPN.

When configuring the PE interface address and the access tunnel information to the determined PE used for access of the VCE, the network side device may further configure the routing protocol according to the routing protocol parameter, and create a VPN instance on the PE. The PE may connect to multiple sites. Through the creation of the VPN instance, each VPN instance corresponds to a site, namely, a connection between each VCE and the PE corresponds to a VPN instance, and each VPN instance is independent of one another, thereby ensuring a secure connection between the VPC and the VPN.

It should be noted that, when the data center device creates the VPC and the VCE, because of a resource limitation of the data center itself, the VPC and the VCE may not be created successfully, or the VCE is not configured successfully. Therefore, an operation of step 104 may specifically be performing a PE configuration according to a configuration resource when a message indicating that the VCE is configured successfully sent by the data center device is received, thereby avoiding a waste of the configuration resource of the network side.

When creating the VPC, the data center device allocates the VPC identifier for the VPC. When the creation and the configuration are successful, the data center device sends the VPC identifier to the network side device. Therefore, the method of this embodiment may further include: determining whether the VPC identifier sent by the data center device is received. If the VPC identifier is received, it is determined that the data center device configures the VCE successfully, and then the operation of step 104 is performed.

It should be further noted that, the operation of step 104 may be further performed after the network side device allocates an access link resource. In this case, the operation of step 104 is not limited to the step of this embodiment, and may be performed before or at the same time of step 103 and step 104. In this embodiment, a process for a virtual private cloud to access a network is described from a perspective of the network side device. The network side device is a server used for processing an access process or other corresponding integrated processing systems at a basic bearer network side. The network side device interacts with the data center device to enable the virtual private cloud to access the network. The data center device is a server used for processing an access process or other corresponding integrated processing systems in the data center.

In this embodiment, after receiving the VPC initial creation request, the network side device determines access information for the VPC, which includes an accessible PE of the VCE, the PE interface address, the VCE uplink port address and the access tunnel, and sends the VPC creation request to the data center. The data center device creates the VPC and the VCE, and allocates the downlink port address for the VCE, and the network side device configures the interface address and the access tunnel information to the determined PE used for access of the VCE. The data center device configures the uplink port address, the downlink port address and the access tunnel information to the VCE, so that the VCE and the PE may establish a connection to enable the VPC to access the VPN in the basic bearer network, and it may be implemented that the VPC accesses the VPN without the need of a uniform control system, so as to solve a problem that the VPC cannot access the network when the basic bearer network and the data center belong to different operators, and meanwhile, further save a device resource.

Figure 2:
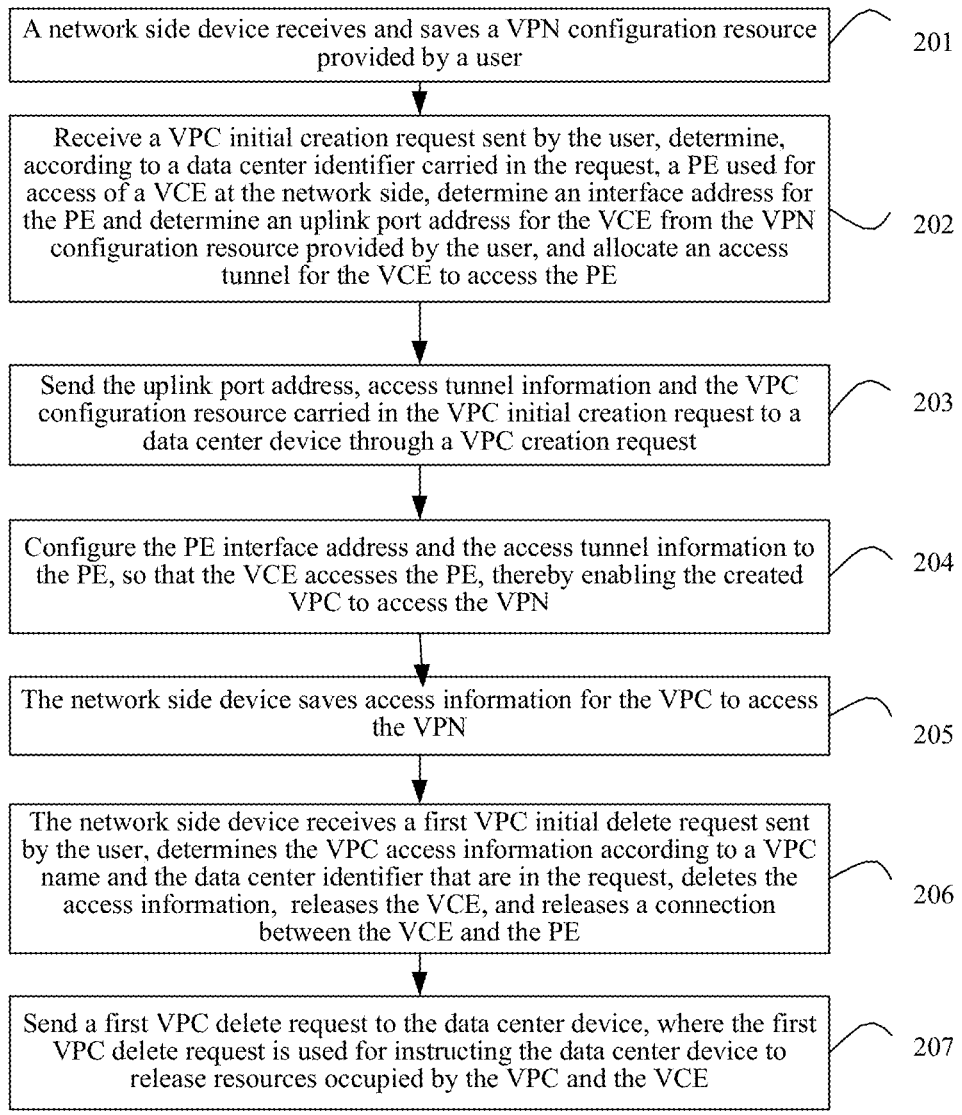
FIG. 2 is a flow chart of Embodiment 2 of a method for a virtual private cloud to access a network according to the present invention.

FIG. 2 is a flow chart of Embodiment 2 of a method for a virtual private cloud to access a network according to the present invention. In this embodiment, step 201 to step 204 are respectively the same as step 101 to step 104 of Embodiment 1. Besides, the method of Embodiment 2 may further include:

Step 205: The network side device saves access information for the VPC to access the VPN.

There may be multiple VPCs accessing the VPN of the basic bearer network, and the created VPC may also be created by different data centers. Therefore, the network side device saves access information of the VPC, where the VPC access information includes a DC identifier, a VPC name and/or a VPC identifier, a VPN name and VPC access link information, and certainly, may further include other information content, and for details, reference may be made to Table 3.

TABLE 3

| DC Identifier | VPC Name | VPC Identifier | VPN Name | PE Interface Identifier | VPC Access Link Information |
|---|---|---|---|---|---|
| ABC.DC | test.abc.VPC | 1 | test.VPN | 4 | Access bandwidth: 100 Mbps Routing protocol type: EBGP PE subinterface IP address: 172.16.1.1/24 VCE uplink port IP address: 172.16.1.2/24 vlanid accessed by a VCE: 5 |

The VPC access link information refers to information of a connection between the VCE and the PE. The VPC access link information may include an access bandwidth, a running routing protocol, a PE interface address, a VCE uplink port address and an access tunnel. Therefore, correspondence of the VPC, the VPN and the data center may be confirmed according to the access information recorded in the table.

Step 206: The network side device receives a first VPC initial delete request message sent by the user, determines the VPC access information according to the VPC name and the data center identifier that are in the request, deletes the access information, and releases the connection between the VCE and the PE.

The first VPC initial delete request needs to carry at least the VPC name and the identifier of the data center accessed by the VPC, may search for the saved corresponding VPC access information according to the VPC name and the data center identifier, delete the access information of the VPC from the memory, and release the connection between the VCE and the PE.

Releasing the connection between the VCE and the PE refers to deleting a connection between the VCE and a corresponding physical interface on the PE.

Step 207: Send a first VPC delete request to the data center device, where the first VPC delete request is used for instructing the data center to release resources occupied by the VPC and the VCE.

The network side device sends the first VPC delete request to the data center device corresponding to the data center identifier in the first VPC initial delete request.

After creating the VPC and the VCE, the data center device may also save creation information of the VPC, where the VPC creation information includes a VPC name and/or a VPC identifier, a VCE configuration parameter, a VPC address parameter and accessed bearer network information, and certainly, may further include other information, and for specific content, reference may be made to Table 4.

TABLE 4

| VPC Identifier | VPC Name | VCE Configuration Parameter | VPC Address Parameter | Accessed Bearer Network (Network Identifier) |
|---|---|---|---|---|
| 1 | test.abc.VPC | Memory: 512M CPU: 1.7 GHz Hard disk: 8 G | VPC IP address segment: 192.168.16.0/24 VCE downlink port IP address: 192.168.16.1/24 | China Telecom bearer network 163 |

The network side device may determine the VPC access information according to the VPC name and the data center identifier that are carried in the first VPC initial delete request. When the VPC access information saves the VPC identifier, a corresponding VPC identifier allocated by the data center may be known according to the VPC access information. Therefore, the first VPC delete request sent to the data center may include the VPC name or the VPC identifier.

The data center device determines and deletes the VPC creation information according to the VPC name or the VPC identifier carried in the first VPC delete request, and releases resources occupied by the VPC and the VCE, which include a hardware resource and an address resource.

It should be noted that, the network side device sends the first VPC delete request to the data center, and the present invention is not limited to that the network side device sends the first VPC delete request after a deletion operation is performed. After receiving the first VPC initial delete request sent by the user, the network side device may also immediately perform an operation of sending the first VPC delete request.

In this embodiment, a process for a virtual private cloud to access a network is described from a perspective of the network side device. The network side device is a server used for processing an access process or other corresponding integrated processing systems at a basic bearer network side. The network side device interacts with the data center device to enable the virtual private cloud to access the network and to delete an access link. The data center device is a server used for processing an access process or other corresponding integrated processing systems in the data center. In this embodiment, in a process of enabling the VPC to access the VPN, the network side device saves the VPC access information. When the user wants to delete the created VPC, the network side device may release, according to the saved VPC access information, the VPC access link, and instruct the data center to delete the resource occupied by the VPC. It should be noted that, the access information saved by the network side device may be further modified by the user, for example, an access bandwidth and a running routing protocol. When performing a corresponding configuration operation, the network side device may use the access bandwidth and the routing protocol.

Figure 3:
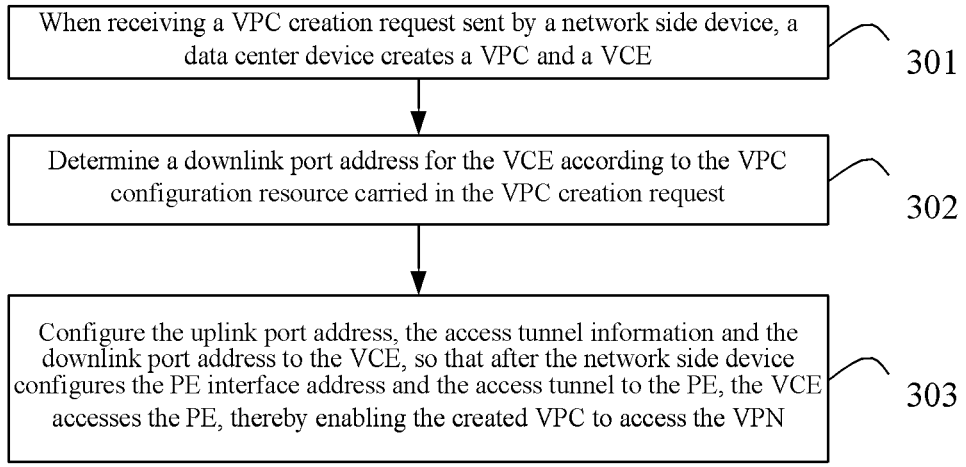
FIG. 3 is a flow chart of Embodiment 3 of a method for a virtual private cloud to access a network according to the present invention.

FIG. 3 is a flow chart of Embodiment 3 of a method for a virtual private cloud to access a network according to the present invention, and the method may include:

Step 301: When receiving a VPC creation request sent by a network side device, a data center device creates a VPC and a VCE.

The VPC creation request is sent after the network side device receives a VPC initial creation request sent by a user, determines, according to a data center identifier carried in the request, a PE used for access of the VCE at a network side, determines an interface address for the PE and determines an uplink port address for the VCE from a VPN creation resource provided by the user, and allocates an access tunnel for the VCE to access the PE.

The VPC creation request may include the uplink port address and access tunnel information that are determined by the network side device and a VPC configuration resource, an access bandwidth and a routing protocol parameter that are carried in the VPC initial creation request.

The data center device creates the VPC, and may further allocate a VPC identifier for the VPC. Because a data center may include multiple created virtual resources, the VPC identifier is used for distinguishing between different VPCs of the data center, the VPC identifier may be indicated by using a simple number, such as 1, 2, 3, . . . , and each VPC identifier is unique in the data center. The VCE created by the data center device may be created according to a physical resource of the data center itself, or created according to a VCE configuration requirement provided by the user, where the configuration requirement may include requirements for a memory, a CPU and a hard disk of the virtual device. Step 302: Determine a downlink port address for the VCE according to the VPC configuration resource carried in the VPC creation request.

The VPC configuration resource is carried in the VPC initial creation request sent by the user.

The VPC configuration resource includes a VPC name and a VPC address segment. According to different requirements of the user, the VPC configuration parameter may further include the number of subnets in the VPC and a network segment of each subnet. After creating the VCE, the data center determines an address for a downlink port of the VCE according to the VPC address segment in the VPC configuration resource. If the created VPC includes multiple subnets according to a requirement of the user, the data center device reallocates, for each subnet, an access tunnel that may access the VCE, which, for example, may be a Vlan id.

Step 303: Configure the uplink port address, the access tunnel information and the downlink port address to the VCE, so that after the network side device configures the PE interface address and the access tunnel information to the determined PE used for access of the VCE, the VCE accesses the PE, thereby enabling the created VPC to access the VPN.

After creating the VCE, the data center device configures the uplink port address, the downlink port address and the access tunnel information to the VCE. If the created VPC includes multiple subnets according to a requirement of the user, the data center reallocates, for each subnet, an access tunnel that may access the VCE, which, for example, may be a Vlan id. After the network side also configures the PE interface address and the access tunnel information to the determined PE used for access of the VCE, the VCE and the PE may establish a connection, thereby enabling the created VPC to access the VPN.

It should be noted that, when the VPC creation request further includes a routing protocol parameter and an access bandwidth, the data center device configures the uplink port address, the downlink port address and the access tunnel to the VCE, and meanwhile, further configures a routing protocol according to the routing protocol parameter and configures an access bandwidth. The routing protocol refers to an executable routing protocol of the PE and the VCE, for example, may be an EBGP, or an IBGP. After the routing protocol is configured, information transmission may be performed. The configuration refers to a process of delivering a resource, so that the resource may be used or run.

After the data center device configures the VCE successfully, the method may further include: sending the VPC identifier to the network side device. After receiving the VPC identifier, the network side device determines that the VCE is configured successfully, then configures the PE interface address and the access tunnel information to the determined PE used for access of the VCE, and meanwhile, may further configures a routing protocol according to the routing protocol parameter, and creates a VPN instance on the PE. The PE may connect to multiple sites. Through the creation of the VPN instance, each VPN instance corresponds to a site, namely, a connection between each VCE and the PE corresponds to a VPN instance, and each VPN instance is independent of one another, thereby ensuring a secure connection between the VPC and the VPN.

In this embodiment, a process for a virtual private cloud to access a network is described from a perspective of the data center device. The data center device is a server used for processing an access process or other corresponding integrated processing systems in the data center. The data center device interacts with the network side device to enable the virtual private cloud to access the network. The network side device is a server used for processing an access process or other corresponding integrated processing systems at a basic bearer network side. In this embodiment, after receiving the VPC creation request sent by the network side device, the data center device creates the VPC and the VCE, determines the VCE downlink port address, and configures the address and the access tunnel to the VCE, so that it may be implemented that the VPC is used as a VPN site. After the network side device configures the address and the access tunnel to the determined PE used for access of the VCE, the VPC may access the VPN in the basic bearer network without the need of a uniform control system, so as to solve a problem that the VPC cannot access the network when the basic bearer network and the data center belong to different operators, and meanwhile, further save a device resource.

Figure 4:
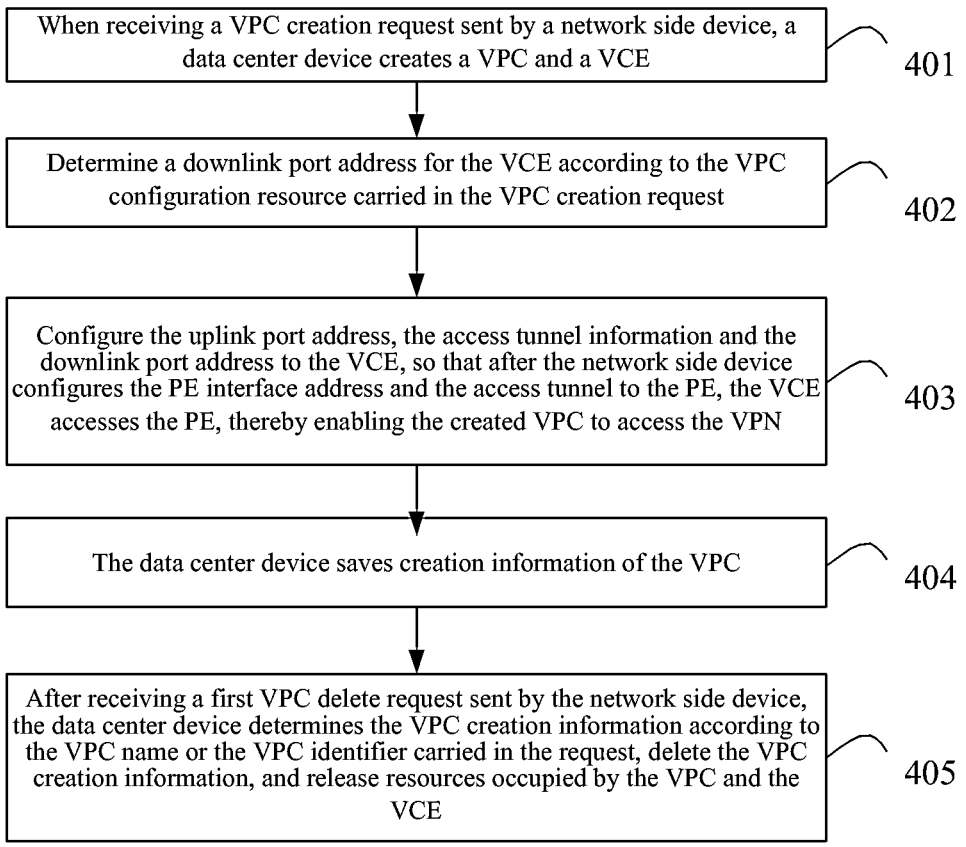
FIG. 4 is a flow chart of Embodiment 4 of a method for a virtual private cloud to access a network according to the present invention.

FIG. 4 is a flow chart of Embodiment 4 of a method for a virtual private cloud to access a network according to the present invention. Steps 401 to 403 of Embodiment 4 are the same as steps 301 to 303 of Embodiment 3. Besides, the method of Embodiment 4 further includes:

Step 404: The data center device saves creation information of the VPC.

The VPC creation information includes resources occupied by the VPC and the VCE, and for specific saved content, reference may be made to Table 4 of Embodiment 1.

Step 405: After receiving a first VPC delete request sent by the network side device, determine the VPC creation information according to the VPC name carried in the first VPC delete request, delete the VPC creation information, and release resources occupied by the VPC and the VCE.

The first VPC delete request is sent after the network side device receives a VPC delete request sent by the user.

When the data center device allocates an identifier for the VPC and feeds back the identifier to the network side device, the network side device saves the VPC identifier into the VPC access information. Therefore, the first VPC delete request sent by the network side device may further carry the VPC identifier, and the data center device may also confirm the VPC creation information according to the VPC identifier.

In this embodiment, a process for a virtual private cloud to access a network is described from a perspective of the data center device. The data center device is a server used for processing an access process or other corresponding integrated processing systems in the data center. The data center device interacts with the network side device to enable the virtual private cloud to access the network and to delete an access link. The network side device is a server used for processing an access process or other corresponding integrated processing systems at a basic bearer network side.

In this embodiment, in a process of enabling the VPC to access the network, the data center device saves the VPC creation information, so as to find the VPC creation information to be deleted when a VPC deletion operation is performed, and release the resources occupied by the VPC and the VCE, thereby breaking a VPC network connection.

Figure 5:
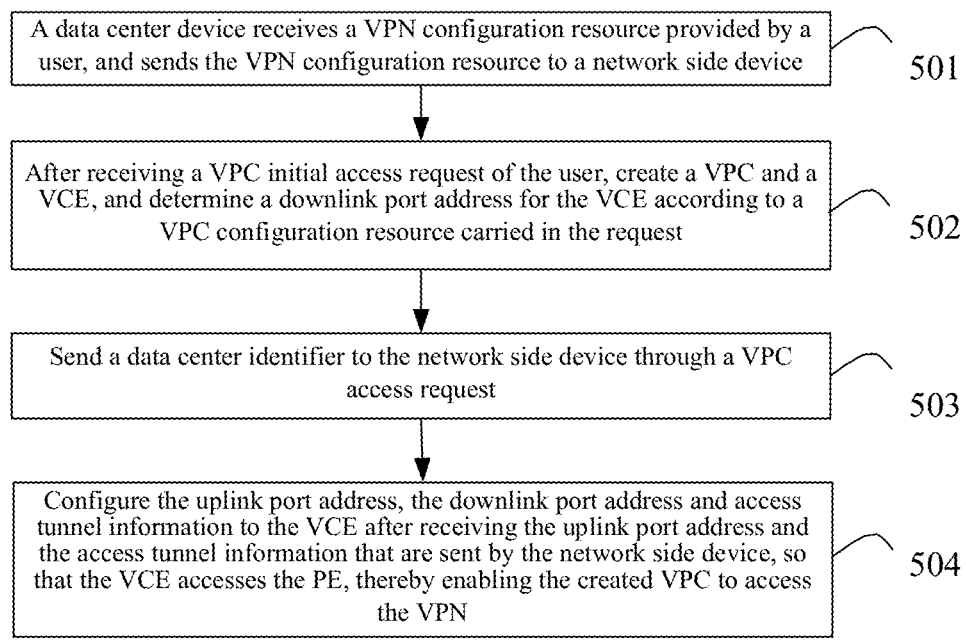
FIG. 5 is a flow chart of Embodiment 5 of a method for a virtual private cloud to access a network according to the present invention.

FIG. 5 is a flow chart of Embodiment 5 of a method for a virtual private cloud to access a network according to the present invention, and the method includes:

Step 501: A data center device receives a VPN configuration resource provided by a user, and sends the VPN configuration resource to a network side device.

Before a VPC is created, the user provides, through a web interface of the data center device, a configuration resource of a VPN that the user hopes to join, the data center device sends the VPN configuration resource to the network side device, and the network side device saves the VPN configuration resource.

For specific content of the VPN configuration resource, reference may be made to the method of Embodiment 1, and details are not repeatedly described herein.

Step 502: After receiving a VPC initial access request of the user, the data center device creates a VPC and a VCE, and determines a downlink port address for the VCE according to a VPC configuration resource carried in the request.

The VPC initial access request includes at least a network identifier, a VPC configuration resource and a name of a VPN to be joined, and may further include information such as a VPC access bandwidth and a routing protocol parameter. The VPC configuration resource includes at least a VPC name and a VPC address segment. According to different requirements of the user, the VPC configuration resource may further include information such as the number of subnets in the VPC, and a network segment of each subnet. The network identifier is a basic bearer network where a VPN that a user hopes to join is located, such as China Telecom bearer network 163.

The data center device creates the VPC according to the VPC initial access request, and may further allocate the VPC identifier for the VPC. Because a data center may include multiple created virtual resources, the VPC identifier is used for distinguishing between different VPCs created by the data center, the VPC identifier may be indicated by using a simple number, such as 1, 2, 3, ..., and each VPC identifier is unique in the data center. The VCE created by the data center device may be created according to a physical resource of the data center itself, or created according to a VCE configuration requirement provided by the user, where the configuration requirement may include requirements for a memory, a CPU and a hard disk of the virtual device. After creating the VCE, the data center device determines the VCE downlink port address according to the VPC address segment in the VPC configuration resource, where if the created VPC includes multiple subnets according to a requirement of the user, the data center device reallocates, for each subnet, an access tunnel that may access the VCE, which, for example, may be a Vlan id.

Step 503: Send a data center identifier to the network side device through a VPC access request.

The VPC access request is used for instructing the network side device to determine, according to the data center identifier, a PE used for access of the VCE at a network side, determine an interface address for the PE and determine an uplink port address for the VCE from the VPN configuration resource provided by the user through the data center device, allocate an access tunnel for the VCE to access the PE, and configure the PE interface address and the access tunnel to the PE.

The VPC access request may include information such as the data center identifier, a name of a VPN to be joined, a VPC access bandwidth and a routing protocol parameter. After the data center device allocates the VPC identifier for the VPC, the VPC access request further includes the VPC identifier.

There may be multiple data centers, and the network side device saves correspondence between the PE and the data center in advance, may determine, according to the data center identifier, the PE used for access of the VCE, and determine an interface address for the PE and determine an uplink port address for the VCE according to the VPN configuration resource. For a specific implementation process, reference may be made to the method of Embodiment 1, and details are not repeatedly described herein.

Step 504: Configure the uplink port address, the downlink port address and the access tunnel to the VCE after receiving the uplink port address and access tunnel information that are sent by the network side device, so that the VCE accesses the PE, thereby enabling the created VPC to access the VPN.

After determining the downlink port address and the access tunnel for the VCE, the network side device sends the downlink port address and the access tunnel to the data center device, and the data center device configures the uplink port address, the downlink port address and the access tunnel information to the VCE, thereby establishing a connection between the VCE and the PE to enable the created VPC to access the VPN.

It should be noted that, the VPC initial access request and the VPC access request further include a routing protocol parameter and an access bandwidth. The network side device and the data center device may further separately configure a routing protocol according to the routing protocol parameter and configure the access bandwidth.

In this embodiment, a process for a virtual private cloud to access a network is described from a perspective of the data center device. The data center device is a server used for processing an access process or other corresponding integrated processing systems in the data center. The data center device interacts with the network side device to enable the virtual private cloud to access the network. The network side device is a server used for processing an access process or other corresponding integrated processing systems at a basic bearer network side.

In this embodiment, the data center device creates the VPC and the VCE according to the VPC initial access request provided by the user, determines the downlink port address for the VCE, sends the VPC access request to the network side device, requests the network side device to determine the PE used for access of the VCE, determines the interface address, the VCE uplink port address and the access tunnel for the PE, and returns the uplink port and the access tunnel to the data center device. The network side device and the data center device respectively configure address information to the PE used for access of the VCE and the VCE, thereby establishing a connection between the VCE and the PE, and enabling the created VPC to access the VPN, so as to solve a problem that the VPC cannot access the network when the basic bearer network and the data center belong to different operators, and meanwhile, save a device resource.

Figure 6:
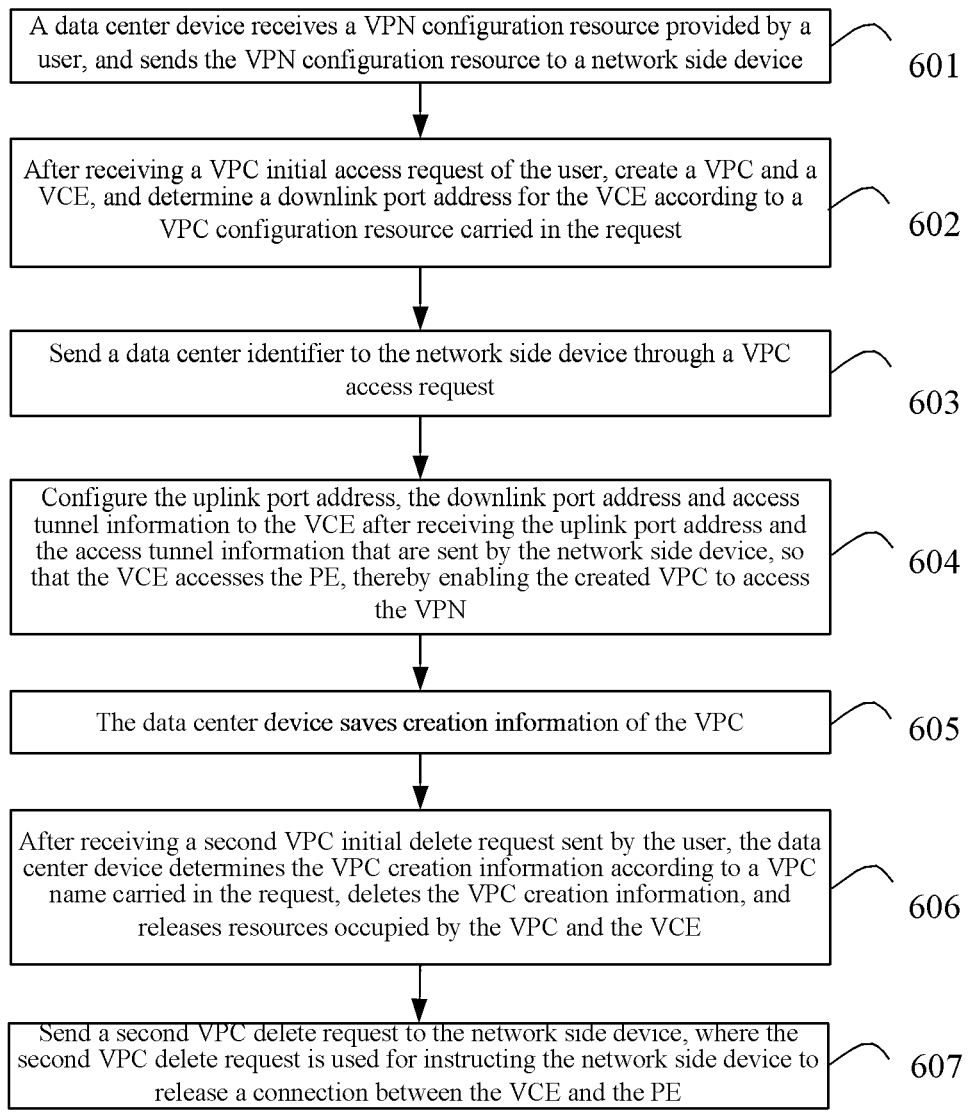
FIG. 6 is a flow chart of Embodiment 6 of a method for a virtual private cloud to access a network according to the present invention.

FIG. 6 is a flow chart of a method for a virtual private cloud to access a network according to Embodiment 6 of the present invention. Step 601 to step 604 of Embodiment 6 are respectively the same as step 501 to step 504 of Embodiment 5. Besides, the method of Embodiment 6 further includes:

Step 605: The data center device saves creation information of the VPC.

The VPC creation information may include resources occupied by the VPC and the VCE, and for specific content, reference may be made to Table 4 of the method of Embodiment 1.

Step 606: After receiving a second VPC initial delete request sent by the user, the data center device determines the VPC creation information according to a VPC name carried in the request, deletes the VPC creation information, and releases the resources occupied by the VPC and the VCE.

The second VPC initial delete request carries at least the VPC name, and may further carry information such as a network identifier of a basic bearer network accessed by the VPC.

Step 607: Send a second VPC delete request to the network side device, where the second VPC delete request is used for instructing the network side device to release a connection between the VCE and the PE.

The second VPC delete request carries the data center identifier and the VPC name of the data center.

The sending the second VPC delete request to the network side device may be sending, according to a network identifier carried in the second VPC initial delete request provided by the user, the VPC delete request to the network side device corresponding to the network identifier, or sending, according to a network identifier included in the determined VPC creation information, the request to the network side device corresponding to the network identifier.

The network side device saves access information for the VPC to access the VPN. Because different data centers may create VPCs with a same name, the second VPC delete request needs to carry the data center identifier and the VPC name. After receiving the second VPC delete request, the network side device may determine, according to the data center identifier and the VPC name that are in the second VPC delete request, the VPC access information to be deleted, delete the access information, and release the connection between the VCE and the PE.

As another embodiment, the data center device may determine the VPC creation information according to the second VPC initial delete request and know a VPC identifier corresponding to the VPC creation information. Identifiers allocated for the created VPC by different data centers may be the same, so the second VPC delete request may further carry the data center identifier and the VPC identifier, and the network side device may also determine and delete the VPC access information according to the data center identifier and the VPC identifier.

It should be noted that, an operation of step 607 is not limited to the step of this embodiment.

In this embodiment, a process for a virtual private cloud to access a network is described from a perspective of the data center device. The data center device is a server used for processing an access process or other corresponding integrated processing systems in the data center. The data center device interacts with the network side device to enable the virtual private cloud to access the network and to delete an access link. The network side device is a server used for processing an access process or other corresponding integrated processing systems at a basic bearer network side. In this embodiment, in a process of enabling the VPC to access the network, the data center device saves the VPC creation information, and after receiving the second VPC initial delete request, the data center device determines the VPC creation information, releases the resources occupied by the VPC and the VCE, and then sends the second VPC delete request to the network side device. The network side device releases the connection between the VCE and the PE, so as to delete the VPC.

Figure 7:
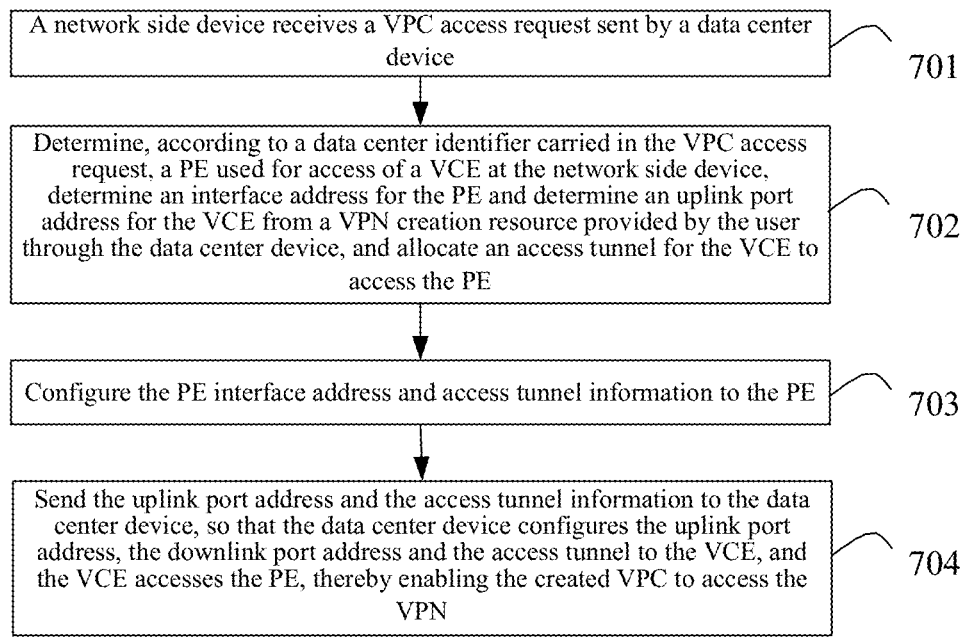
FIG. 7 is a flow chart of Embodiment 7 of a method for a virtual private cloud to access a network according to the present invention.

FIG. 7 is a flow chart of Embodiment 7 of a method for a virtual private cloud to access a network according to the present invention, and the method may include:

Step 701: A network side device receives a VPC access request sent by a data center device.

The VPC access request is sent after the data center device receives a VPC initial access request sent by a user, creates a VPC and a VCE, and determines a downlink port address for the VCE according to a VPC configuration resource carried in the request, where the VPC access request includes a data center identifier of the data center.

The VPC access request includes the data center identifier and a name of a VPN to be joined, and may further include information such as a VPC access bandwidth and a routing protocol parameter. After the data center allocates a VPC identifier for the created VPC, the VPC access request further includes the VPC identifier.

Step 702: Determine, according to a data center identifier carried in the VPC access request, a PE used for access of the VCE at the network side device, determine an interface address for the PE and determine an uplink port address for the VCE from a VPN creation resource provided by the user through the data center device, and allocate an access tunnel for the VCE to access the PE.

Processes of determining, according to the carried data center identifier, a PE used for access of the VCE at the network side device, and determining an interface address for the PE and determining an uplink port address for the VCE from the VPN creation resource, and allocating an access tunnel for the VCE to access the PE are similar to those of the method of Embodiment 1, and are not repeatedly described herein.

Step 703: Configure the PE interface address and access tunnel information to the determined PE used for access of the VCE.

Step 704: Send the uplink port address and the access tunnel information to the data center device, so that the data center device configures the uplink port address, the downlink port address and the access tunnel information to the VCE, and the VCE accesses the PE, thereby enabling the created VPC to access the VPN.

The data center device configures a routing protocol according to a routing protocol parameter carried in the VPC initial access request, and sends the routing protocol parameter to the network side device through the VPC access request. The network side device may further configure the routing protocol according to the routing protocol parameter carried in the VPC access request.

In this embodiment, a process for a virtual private cloud to access a network is described from a perspective of the network side device. The network side device is a server used for processing an access process or other corresponding integrated processing systems at a basic bearer network side. The network side device interacts with the data center device to enable the virtual private cloud to access the network. The data center device is a server used for processing an access process or other corresponding integrated processing systems in the data center.

In this embodiment, through an interaction process of the data center device and the network side device, it is implemented that the VPC accesses the VPN in the basic bearer network; especially when the basic bearer network and the data center belong to different operators, the VPC may still access the network without the need of setting a uniform control system, and meanwhile, a device resource is saved.

Figure 8:
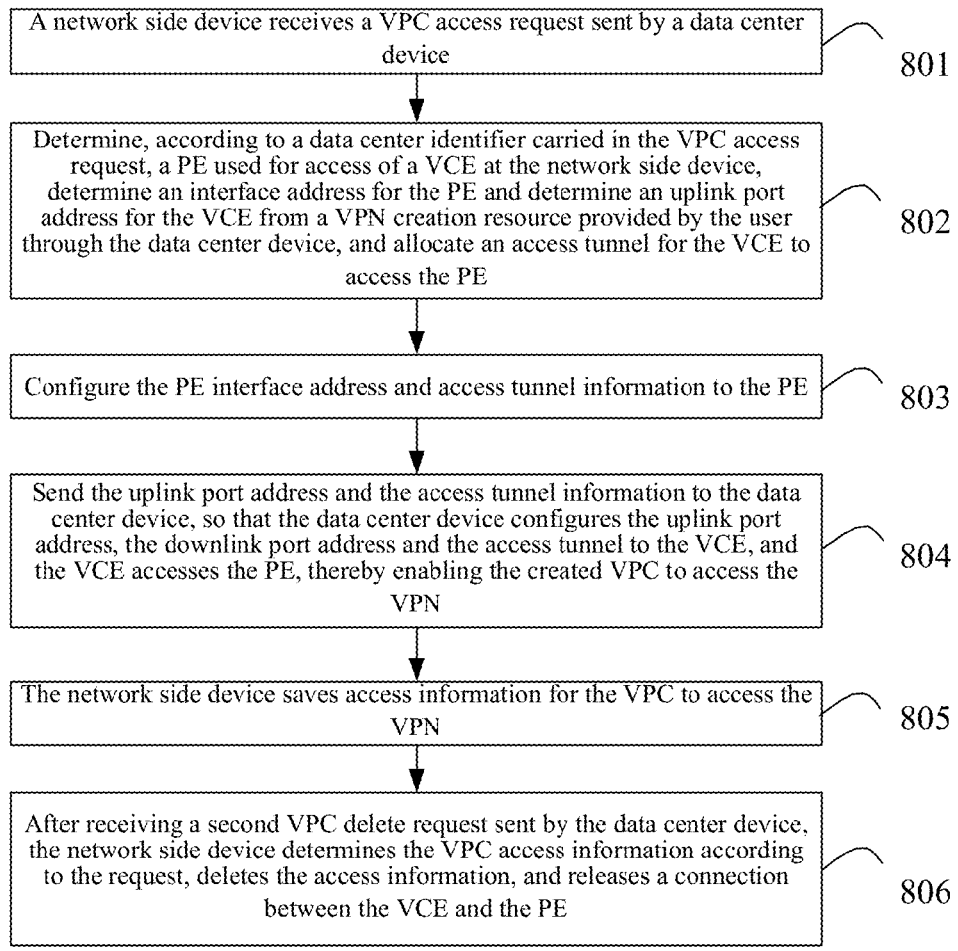
FIG. 8 is a flow chart of Embodiment 8 of a method for a virtual private cloud to access a network according to the present invention.

FIG. 8 is a flow chart of Embodiment 8 of a method for a virtual private cloud to access a network according to the present invention. Step 801 to step 804 of Embodiment 8 are respectively the same as step 701 to step 704 of Embodiment 7. Besides, the method of Embodiment 8 further includes:

Step 805: The network side device saves access information for the VPC to access the VPN.

For details of content of the saved VPC access information, reference may be made to Table 3.

Step 806: After receiving a second VPC delete request sent by the data center device, the network side device determines the VPC access information according to the data center identifier and the VPC name or the data center identifier and the VPC identifier that are in the request, deletes the access information, and releases a connection between the VCE and the PE.

The second VPC delete request is sent after the data center device receives a second VPC initial delete request sent by the user.

In this embodiment, a process for a virtual private cloud to access a network is described from a perspective of the network side device. The network side device is a server used for processing an access process or other corresponding integrated processing systems at a basic bearer network side. The network side device interacts with the data center device to enable the virtual private cloud to access the network and to delete an access link. The data center device is a server used for processing an access process or other corresponding integrated processing systems in the data center.

In this embodiment, in a process of enabling the VPC to access the network, the network side device may further save the VPC access information, and determine the VPC access information when receiving the second VPC delete request sent by the data center device, so as to delete the VPC access information, and release the connection between the VCE and the PE, thereby breaking a VPC network connection.

Figure 9:
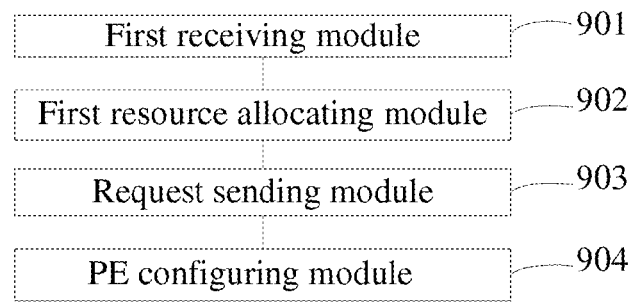
FIG. 9 is a schematic structural diagram of Embodiment 1 of a network side device according to the present invention.

Corresponding to Embodiment 1 of the method for a virtual private cloud to access a network according to the present invention, FIG. 9 is a schematic structural diagram of Embodiment 1 of a network side device according to the present invention, and the network side device may include:

a first receiving module 901, configured to receive a VPC initial creation request provided by a user, where the first receiving module may be further configured to receive a VPN configuration resource provided by the user, and save the VPN configuration resource in a memory module of the device;

the VPC initial creation request includes at least a data center identifier, a VPC configuration resource and a name of a VPN to be joined, and may further include information such as a VPC access bandwidth and a routing protocol parameter. The VPN configuration resource includes at least a VPC name and a VPC address segment. According to different requirements of the user, the VPC configuration parameter may further include the number of subnets in the VPC and a network segment of each subnet;

a first resource allocating module 902, configured to determine, according to a data center identifier carried in the VPC initial creation request, a PE used for access of a VCE at a network side, determine an interface address for the PE and determine an uplink port address for the VCE from a VPN creation resource provided by the user, and allocate an access tunnel for the VCE to access the PE;

a request sending module 903, configured to send a VPC creation request to a data center device, where the VPC creation request carries the uplink port address, access tunnel information and the VPC configuration resource carried in the VPC initial creation request, where the VPC creation request may further carry an access bandwidth and a routing protocol parameter that are carried in the VPC initial creation request;

the VPC creation request is used for instructing the data center device to create the VPC and the VCE, determine a downlink port address for the VCE according to the VPC configuration resource, and configure the uplink port address, the downlink port address and the access tunnel information to the VCE; and a PE configuring module 904, configured to configure the PE interface address and the access tunnel information to the determined PE used for access of the VCE.

In this embodiment, the network side device may be a single network server, and may also be an integrated processing system. Each function module may be integrated in the system as a single entity. For example, the first receiving module may be a single web server for receiving information provided by the user.

In this embodiment, the network side device receives the VPC initial creation request sent by the user and a configuration resource of a certain VPN that the user wants to join, and interacts with the data center device, thereby enabling the VPC created by the data center device to join a certain VPN of a basic bearer network where the network side device is located. When the basic bearer network and the data center belong to different operators, the user only signs a use protocol with a network operator, so as to create the VPC and enable the VPC to access the VPN of the basic bearer network.

Figure 10:
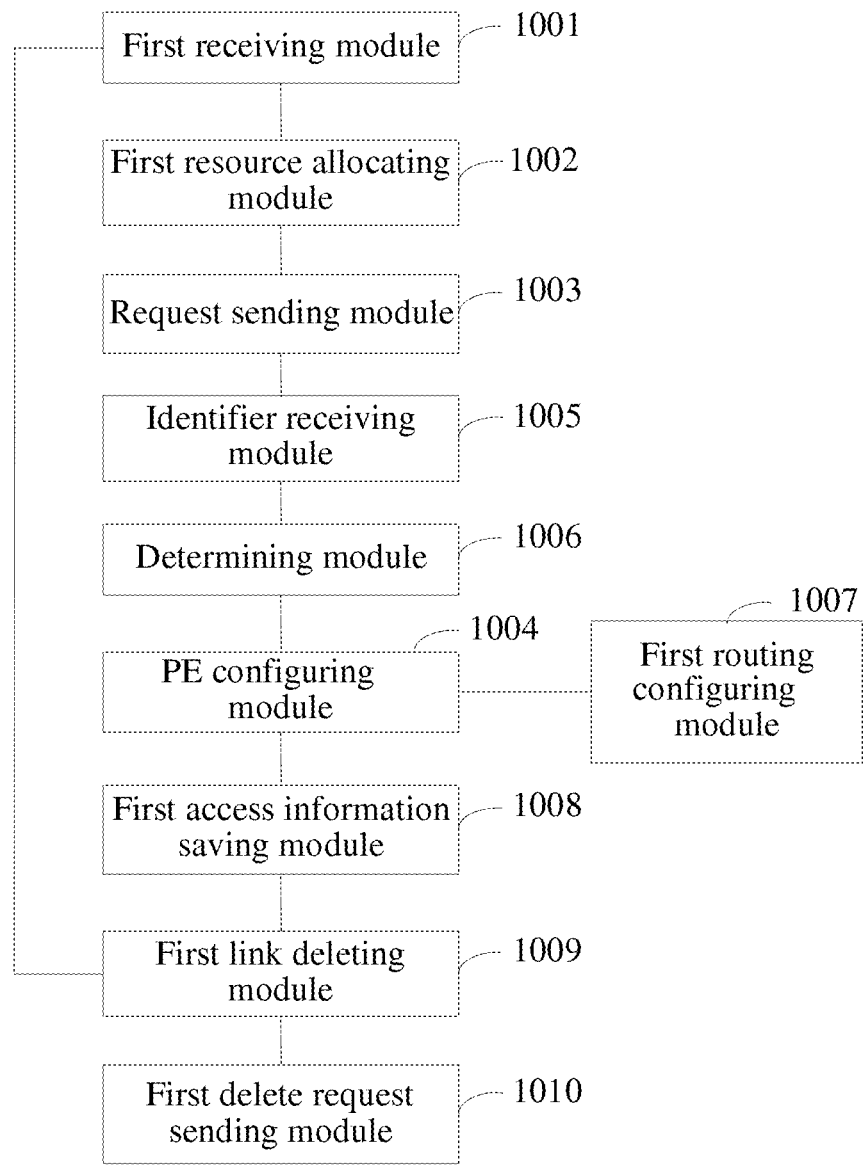
FIG. 10 is a schematic structural diagram of Embodiment 2 of a network side device according to the present invention.

FIG. 10 is a schematic structural diagram of Embodiment 2 of a network side device according to the present invention. A first receiving module 1001, a first resource allocating module 1002, a request sending module 1003 and a PE configuring module 1004 in the network side device of Embodiment 2 are respectively the same as the first receiving module 901, the first resource allocating module 902, the request sending module 903 and the PE configuring module 904 of Embodiment 1. Besides, the first receiving module 1001 is further configured to receive a first VPC initial delete request sent by a user.

The network side device of Embodiment 2 further includes:

an identifier receiving module 1005, configured to receive a VPC identifier sent by the data center device;

a determining module 1006, configured to determine whether the identifier receiving module 1005 receives the VPC identifier, and if yes, determine that the data center device configures the VCE successfully, and start the PE configuring module 1004;

a first routing configuring module 1007, configured to configure a routing protocol according to a routing protocol parameter carried in the VPC initial creation request, where the first routing configuring module is further configured to perform an access bandwidth configuration according to an access bandwidth carried in the VPC initial creation request;

a first access information saving module 1008, configured to save access information for the VPC to access the VPN;

a first link deleting module 1009, configured to determine the VPC access information according to a VPC name and the data center identifier that are in the first VPC initial delete request, delete the access information and release a connection between the VCE and the PE; and a first delete request sending module 1010, configured to send a first VPC delete request to the data center device.

The network side device is configured to send the first VPC delete request to the data center device corresponding to the data center identifier in the first VPC initial delete request.

The first VPC delete request is used for instructing the data center device to release resources occupied by the VPC and the VCE.

The first VPC delete request may further carry the VPC identifier, where the VPC identifier is obtained from the VPC access information determined by the VPC name and the data center identifier.

In this embodiment, the network side device may be a single network server, and may also be an integrated processing system. Each function module may be integrated in the system as a single entity. For example, the first receiving module may be a single web server for receiving information provided by the user.

In this embodiment, the network side device receives the VPC initial creation request sent by the user and a configuration resource of a certain VPN that the user wants to join, and interacts with the data center device, thereby enabling the VPC created by the data center device to join a certain VPN of a basic bearer network where the network side device is located. When the basic bearer network and the data center belong to different operators, the user only signs a use protocol with a network operator, so as to create the VPC and enable the VPC to access the VPN of the basic bearer network. The network side device saves the VPC access information, and determines the VPC access information when receiving the first VPC initial delete request sent by the user, so as to delete the VPC access information, and release the connection between the VCE and the PE, thereby breaking a VPC network connection.

Figure 11:
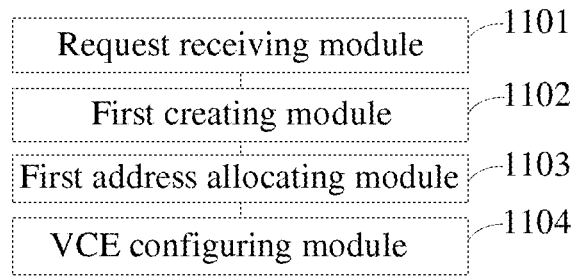
FIG. 11 is a schematic structural diagram of Embodiment 1 of a data center device according to the present invention.

Corresponding to Embodiment 3 of the method for a virtual private cloud to access a network according to the present invention, FIG. 11 is a schematic structural diagram of Embodiment 1 of a data center device according to the present invention, and the data center device may include:

a request receiving module 1101, configured to receive a VPC creation request sent by a network side device, where the VPC creation request carries an uplink port address and access tunnel information that are allocated by the network side device and a VPC configuration parameter carried in a VPC initial access request;

a first creating module 1102, configured to create a VPC and a VCE after the VPC creation request is received;

a first address allocating module 1103, configured to determine a downlink port address for the VCE according to a VPC configuration resource carried in the VPC creation request; and a VCE configuring module 1104, configured to configure the uplink port address, the access tunnel information and the downlink port address to the VCE.

In this embodiment, the data center device may be a single network server, and may also be an integrated processing system. Each function module may be integrated in the processing system as a single entity. For example, the information receiving module may be a single web server connecting to the other modules for receiving information provided by a user.

In this embodiment, the data center device receives the VPC creation request sent by the network side device and a VPC access link resource, creates a VPC and performs an access configuration, which may enable the VPC to access the VPN in a form of a VPN site. Without the need of direct interaction with the user, when a basic bearer network and a data center belong to different operators, the user only signs a use protocol with a network operator, which may enable the VPC to access the network.

Figure 12:
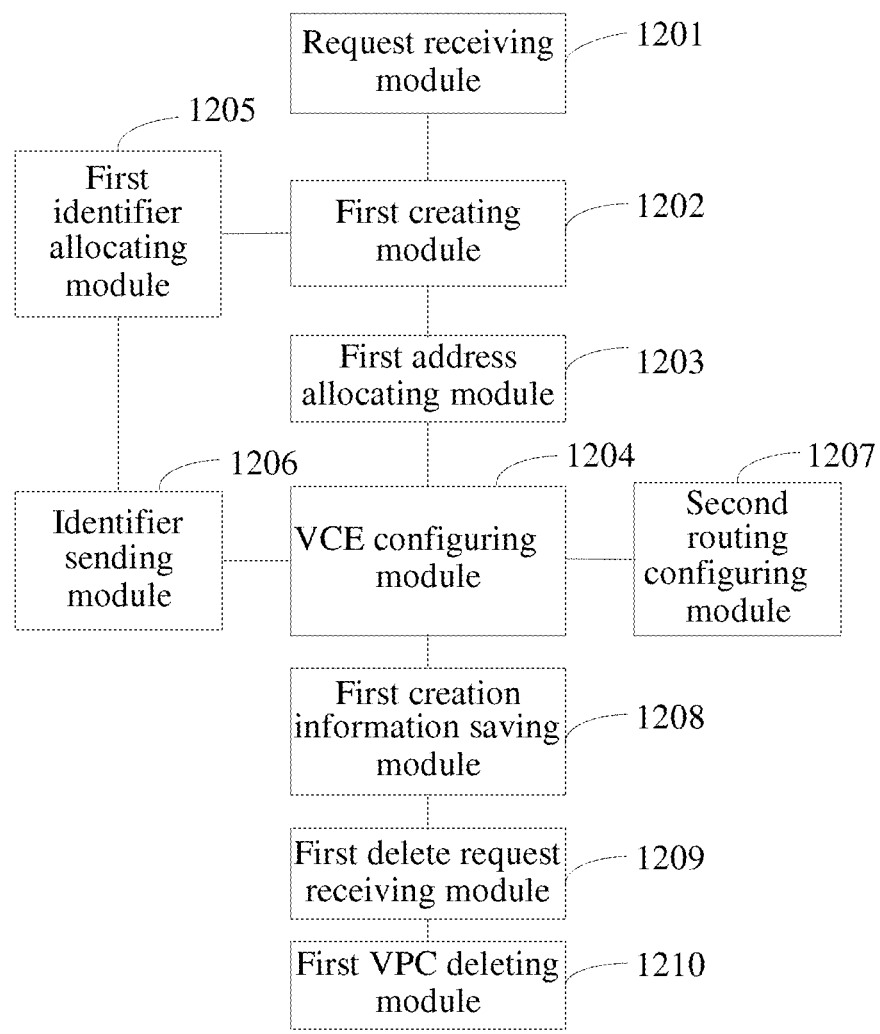
FIG. 12 is a schematic structural diagram of Embodiment 2 of a data center device according to the present invention.

FIG. 12 is a schematic structural diagram of Embodiment 2 of a data center device according to the present invention. A request receiving module 1201, a first creating module 1202, a first address allocating module 1203 and a VCE configuring module 1204 in the data center device of Embodiment 2 are respectively the same as the request receiving module 1101, the first creating module 1102, the first address allocating module 1103 and the VCE configuring module 1104 in Embodiment 1 of the data center device. Besides, the data center device of Embodiment 2 further includes:

an identifier allocating module 1205, configured to allocate a VPC identifier for the created VPC, where when creating the VPC and the VCE, the data center device may further allocate a VPC identifier for the created VPC; the VPC identifier is used for distinguishing between different VPCs of the data center, the VPC identifier may be indicated by using a simple number, such as 1, 2, 3, . . . , and each VPC identifier is unique in the data center;

an identifier sending module 1206, configured to, when the VCE is configured successfully, feed back the VPC identifier to the network side device;

a second routing configuring module 1207, configured to configure a routing protocol according to a routing protocol parameter carried in the VPC creation request;

a first creation information saving module 1208, configured to save creation information of the VPC;

a first delete request receiving module 1209, configured to receive a first VPC delete request sent by the network side device; and a first VPC deleting module 1210, configured to determine the VPC creation information according to the VPC name or the VPC identifier carried in the first VPC delete request, delete the VPC creation information, and release resources occupied by the VPC and the VCE, where the first VPC delete request is sent after the network side device receives a VPC delete request of the user.

In this embodiment, the data center device may be a single network server, and may also be an integrated processing system. Each function module may be integrated in the processing system as a single entity. For example, the information receiving module may be a single web server connecting to the other modules for receiving information provided by the user.

In this embodiment, in a process of enabling the VPC to access the network, the data center device further saves the VPC creation information, and finds the VPC creation information to be deleted when a VPC deletion operation is performed, so as to release the resources occupied by the VPC and the VCE.

Figure 13:
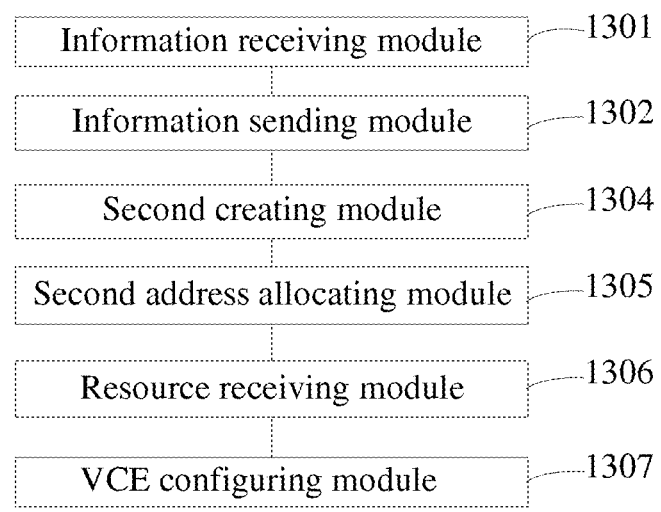
FIG. 13 is a schematic structural diagram of Embodiment 3 of a data center device according to the present invention.

Corresponding to Embodiment 5 of the method for a virtual private cloud to access a network according to the present invention, FIG. 13 is a schematic structural diagram of Embodiment 3 of a data center device according to the present invention, and the data center device includes:

an information receiving module 1301, configured to receive a VPC initial access request sent by a user, where the VPC initial access request includes at least a network identifier, a VPC configuration parameter and a name of a VPN to be joined, and may further include information such as a VPC access bandwidth and a routing protocol parameter; the network identifier is a basic bearer network where a VPN that a user hopes to join is located, such as China Telecom bearer network 163, and the information receiving module 1301 may be further configured to receive a VPN configuration resource provided by the user and send the VPN configuration resource to a corresponding network side device;

a second creating module 1302, configured to create a VPC and a VCE according to the VPC initial access request;

a second address allocating module 1303, configured to allocate a downlink port address for the VCE according to a VPC configuration resource carried in the VPC initial access request;

an information sending module 1304, configured to send a VPC access request to the network side device, where the VPC access request carries a data center identifier; where the VPC access request includes a data center identifier and a name of a VPN to be joined, and may further include information such as a VPC access bandwidth and a routing protocol parameter; and the network side device determines, according to the data center identifier, the PE used for access of the VCE at the network side, determines an interface address for the PE and determines an uplink port address for the VCE from the VPN configuration resource provided by the user through the data center device, allocates an access tunnel for the VCE to access the PE, and configures the PE interface address and access tunnel information to the determined PE used for access of the VCE;

a resource receiving module 1305, configured to receive the uplink port address and the access tunnel information that are sent by the network side device; and a VCE configuring module 1306, configured to configure the uplink port address, the downlink port address and the access tunnel information to the VCE.

In this embodiment, the data center device may be a single network server, and may also be an integrated processing system. Each function module may be integrated in the processing system as a single entity. For example, the information receiving module may be a single web server connecting to the other modules for receiving information provided by the user.

In this embodiment, the data center device receives the VPN configuration resource of the user and the VPC initial access request, creates the VPC, interacts with the network side device, and performs an access configuration, thereby enabling the VPC to join a certain VPN of the basic bearer network where the network side device is located. When the basic bearer network and the data center belong to different operators, the user only signs a use protocol with a data center operator, so as to create the VPC and enable the VPC to access the VPN of the basic bearer network.

Figure 14:
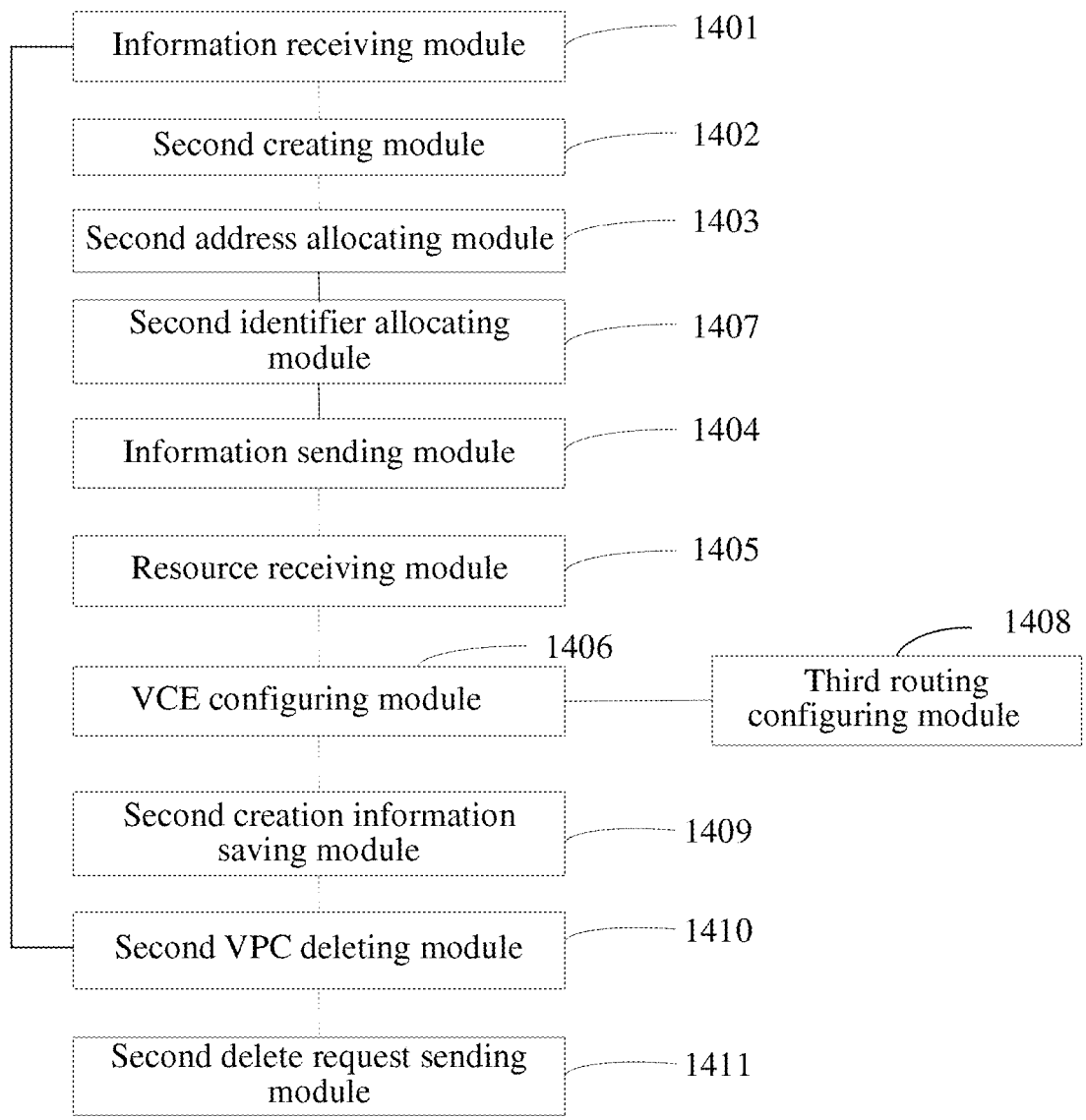
FIG. 14 is a schematic structural diagram of Embodiment 4 of a data center device according to the present invention.

FIG. 14 is a schematic structural diagram of Embodiment 4 of a data center device according to the present invention. An information receiving module 1401, a second creating module 1402, a second address allocating module 1403, an information sending module 1404, a resource receiving module 1405, a VCE configuring module 1406 and a second identifier allocating module 1407 in Embodiment 4 of the data center device are respectively the same as the information receiving module 1301, the second creating module 1302, the second address allocating module 1303, the information sending module 1304, the resource receiving module 1305, the VCE configuring module 1306 and the second identifier allocating module 1307 in Embodiment 3 of the data center device, besides, the information receiving module 1401 is further configured to receive a second VPC initial delete request sent by a user.

The data center device of Embodiment 4 may further include:

a second identifier allocating module 1407, configured to allocate a VPC identifier for the created VPC, where the VPC identifier may be sent to the network side device through the VPC access request, and saved by the network side device, and when a VPC initial access request sent by the user further includes a routing protocol parameter, the device may further include:

a third routing configuring module 1408, configured to configure a routing protocol according to the routing protocol parameter carried in the VPC initial access request, where the VPC initial access request may further include an access bandwidth, and the third routing configuring module is further configured to configure the access bandwidth;

a second creation information saving module 1409, configured to save creation information of the VPC;

a second VPC deleting module 1410, configured to determine VPC creation information according to a VPC name carried in the second VPC initial delete request sent by the user, delete the VPC creation information and release resources occupied by the VPC and the VCE; and a second delete request sending module 1411, configured to send a second VPC delete request to the network side device, where the second VPC delete request may carry a data center identifier and a VPC name or a data center identifier and the VPC identifier.

In this embodiment, the data center device may be a single network server, and may also be an integrated processing system. Each function module may be integrated in the processing system as a single entity. For example, the information receiving module may be a single web server connecting to the other modules for receiving information provided by the user.

In this embodiment, in a process of enabling the VPC to access the network, the data center device further saves the VPC creation information, and after receiving the second VPC initial delete request, the data center device determines the VPC creation information, releases resources occupied by the VPC and the VCE, and then sends the second VPC delete request to the network side device. The network side device releases the connection between the VCE and the PE, so as to delete the VPC.

Figure 15:
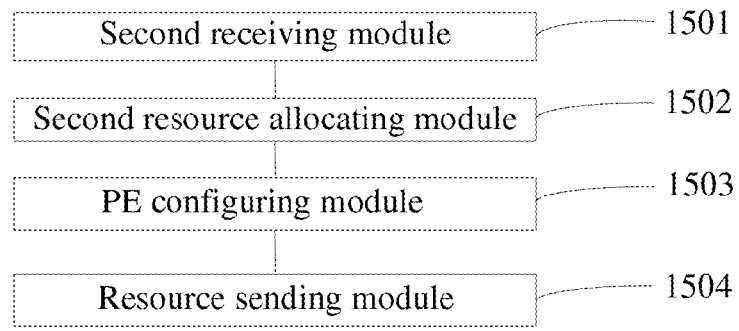
FIG. 15 is a schematic structural diagram of Embodiment 3 of a network side device according to the present invention.

Corresponding to Embodiment 7 of the method for a virtual private cloud to access a network according to the present invention, FIG. 15 is a schematic structural diagram of Embodiment 3 of a network side device according to the present invention, and the network side device may include:

a second receiving module 1501, configured to receive a VPC access request sent by a data center device, where the VPC access request is sent after the data center device receives a VPC initial access request of a user, and creates a VPC and a VCE;

the second receiving module may be further configured to receive a VPN configuration resource sent by the user through the data center device; and the data center device may further include a VPN configuration resource saving module to save the VPN configuration resource;

a second resource allocating module 1502, configured to determine, according to a data center identifier carried in the VPC access request, a PE used for access of a VCE at a network side, determine an interface address for the PE and determine an uplink port address for the VCE from a VPN creation resource provided by the user through the data center device, and allocate an access tunnel for the VCE to access the PE;

a PE configuring module 1503, configured to configure the PE interface address and access tunnel information to the determined PE used for access of the VCE; and a resource sending module 1504, configured to send the uplink port address and the access tunnel information to the data center device.

The data center device configures the uplink port address, the downlink port address and the access tunnel to the VCE, and the VCE and the PE establish a link connection to enable the VPC to access the VPN. The downlink port address is allocated for the VCE by the data center device according to the VPC configuration resource carried in the VPC initial access request.

In this embodiment, the network side device may be a single network server, and may also be an integrated processing system. Each function module may be integrated in the processing system as a single entity. For example, the first receiving module may be a single web server for receiving information provided by the user.

In this embodiment, the network side device receives the VPC access request sent by the data center device, interacts with the data center device and performs an access configuration to enable the VPC to access a certain VPN in the basic bearer network. When the basic bearer network and the data center belong to different operators, the user only signs a use protocol with a data center operator, so that it may be implemented that the VPC accesses a network without the need of setting a uniform control system, and meanwhile, a device resource is saved.

Figure 16:
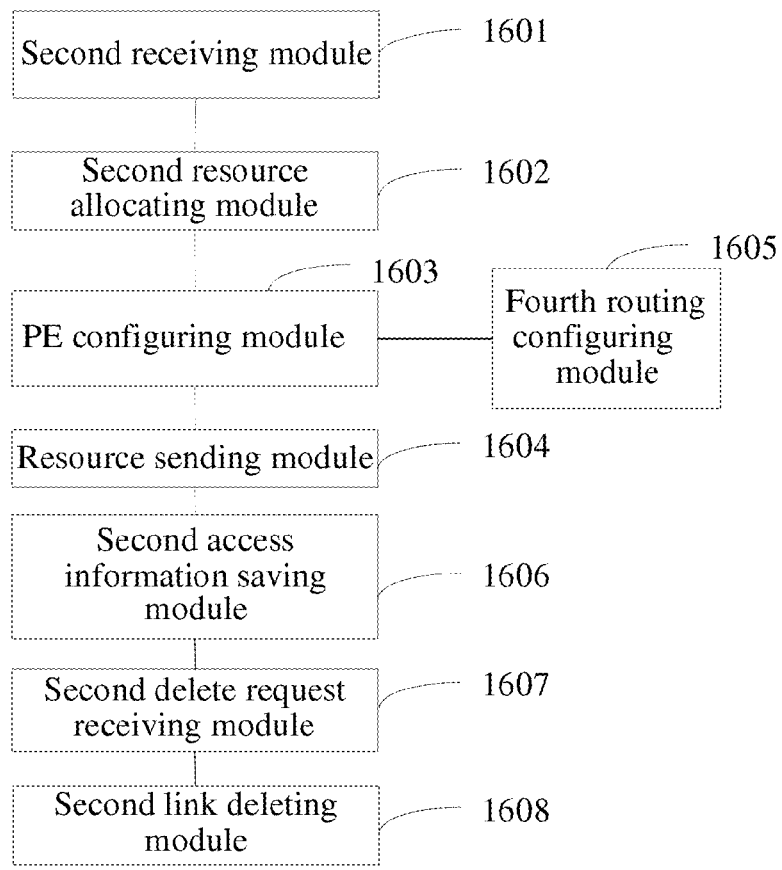
FIG. 16 is a schematic structural diagram of Embodiment 4 of a network side device according to the present invention.

FIG. 16 is a schematic structural diagram of Embodiment 4 of a network side device according to the present invention, and a second receiving module 1601, a second resource allocating module 1602, a PE configuring module 1503 and a resource sending module 1504 in Embodiment 4 of the network side device are the same as those in Embodiment 3 of the network side device. Besides, the VPC access request further carries a routing protocol parameter carried in the VPC initial access request sent by the user.

The network side device of Embodiment 4 may further include:

a fourth routing configuring module 1605, configured to configure a routing protocol according to the routing protocol parameter carried in the VPC access request;

a second access information saving module 1606, configured to save access information for the VPC to access the VPN;

a second delete request receiving module 1607, configured to receive a second VPC delete request sent by the data center device; and a second link deleting module 1608, configured to determine VPC access information according to the data center identifier and a VPC name or the data center identifier and a VPC identifier that are in the second VPC delete request, delete the access information, and release a connection between a VCE and a PE.

In this embodiment, the network side device may be a single network server, and may also be an integrated processing system. Each function module may be integrated in the system as a single entity. For example, the first receiving module may be a single web server for receiving information provided by the user.

In this embodiment, in a process of enabling the VPC to access the network, the network side device further saves the VPC access information, and determines the VPC access information when receiving the second VPC delete request sent by the data center device, so as to delete the VPC access information, and release the connection between the VCE and the PE, thereby breaking a VPC network connection.

In an actual application, the data center and the basic bearer network generally do not belong to a same operator, an existing manner of adopting a control system to perform uniform management cannot enable the VPC created by the data center to join a certain VPN of the network. However, by adopting the technical solutions of the present invention, the user only needs to provide a basic configuration resource and request for one party, so as to create a VPC and enable the created VPC to access a certain VPN.

Figure 17:
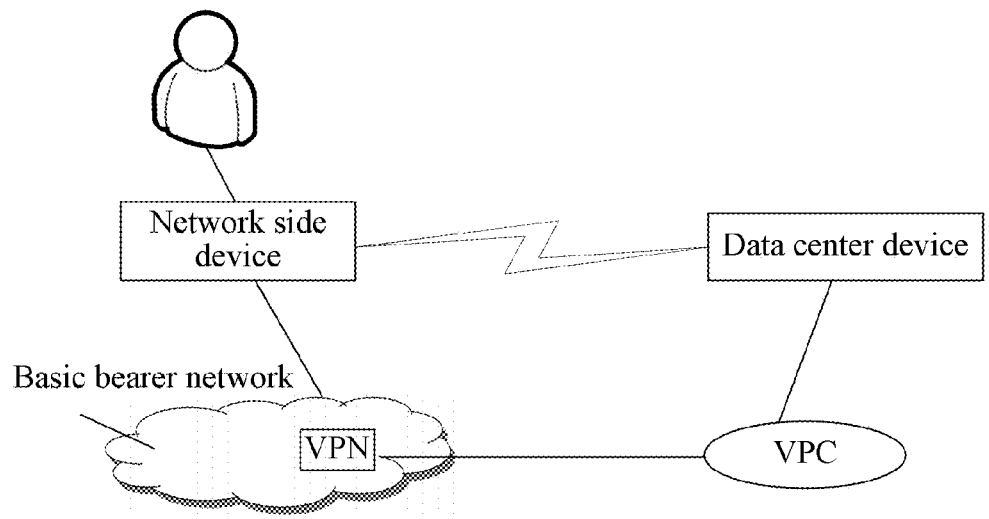
FIG. 17 is a schematic diagram of an overall structure in an actual application scenario according to the present invention.

FIG. 17 is a schematic diagram of an overall structure in an actual application scenario according to the present invention. A user signs a use protocol with a network operator, and a network side device interacts with a data center device, so as to enable a created VPC to access a VPN in a basic bearer network.

With reference to the structural diagram of FIG. 17, in an actual application, the user provides a VPN configuration resource for the network side device in advance, and the network side device may build a VPN according to the VPN configuration resource. The network side device saves the VPN configuration resource, after receiving a VPC initial creation request sent by the user, determines a PE used for access of a VCE at a network side, determines an interface address for the PE, determines an uplink port address for the VCE, and allocates an access tunnel for the VCE to access the PE. Then the network side device sends a VPC creation request to the data center device, and the data center device creates the VPC and the VCE after receiving the request, and determines a downlink port address for the VCE, configures the uplink port address and the access tunnel that are carried in the VPC creation request and the downlink port address to the VCE. The data center device returns a VPC identifier allocated when creating the VPC to the network side device. After receiving the VPC identifier, the network side device configures the PE interface address and the access tunnel to the PE used for access of the VCE at the network side. The VCE uplink port address and the PE interface address are in a same address segment, so that the VCE may establish a connection with the PE, thereby enabling the VPC created by the data center to access the VPN at a basic bearer network side.

Figure 18:
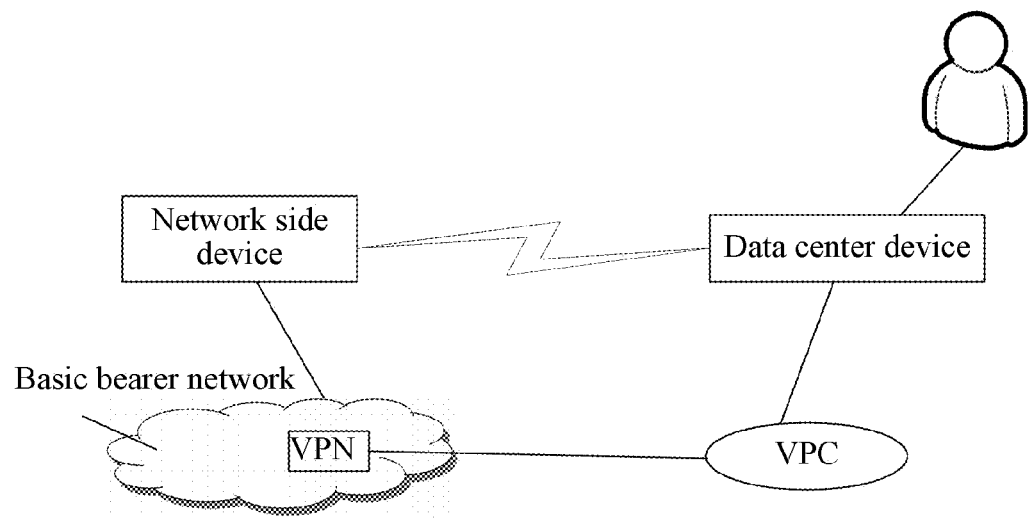
FIG. 18 is a schematic diagram of another overall structure in an actual application scenario according to the present invention.

FIG. 18 is a schematic diagram of another overall structure in an actual application scenario according to the present invention. A user signs a use protocol with a data center operator, and a network side device interacts with a data center device, so as to finally create a VPC and enable the created VPC to access a VPN in a basic bearer network.

With reference to the structural diagram of FIG. 18, in an actual application, the user provides a VPN configuration resource for the data center device, and the data center device sends the VPN configuration resource to the network side device. The network side device saves the VPN configuration resource and may build a VPN according to the VPN configuration resource. After receiving a VPC initial access request sent by the user, the data center device creates a VPC and a VCE, determines a downlink port access address for the VCE, and then sends a VPC access request to the network side device. The network side device determines, according to the VPC access request, a PE used for access of the VCE, determines an interface address for the PE, determines an uplink port address for the VCE, allocates an access tunnel for the VCE to access the PE, and configures the PE interface address and the access tunnel to the determined PE used for access of the VCE. At the same time, the network side device sends the uplink port address and the access tunnel to the data center device, and the data center device configures the uplink port address, the downlink port address and the access tunnel to the VCE. The VCE uplink port address and the PE interface address are in a same address segment, so the VCE may access the PE, thereby enabling the created VPC to access the VPN.

For a specific operation of accessing the network, reference may be made to the foregoing embodiments, and details are not repeatedly described herein.

It should be noted that, when the data center and the network belong to a same operator, adopting the technical solutions of the present invention may still enable the VPC to access the VPN. At the same time, there is no need to set a control system to perform uniform management, thereby saving a device resource.

The embodiments in this specification are described in a progressive manner, each embodiment focuses on a difference from other embodiments, and for same and similar parts between the embodiments, reference may be made to each other. The apparatus disclosed by the embodiments corresponds to the method disclosed by the embodiments, so the description is simple, and for related parts, reference may be made to the description of the method parts.

It should be noted that, in this specification, relational terms such as first and second are merely used for distinguishing one entity or operation from another entity or operation, and do not necessarily require or imply that any actual relationship or sequence exists between these entities or operations. In addition, the term "include", "comprise" or any other variant is intended to cover a non-exclusive inclusion, so that a process, a method, an item or a device including a series of elements not only includes those elements, but also includes other elements not listed explicitly, or further includes inherent elements of the process, the method, the item or the device. In a case without more limitation, an element limited by the statement "includes one" does not exclude that the process, the method, the item or the device including the element further includes another same element.

For convenience of description, when the foregoing apparatus is described, the apparatus is divided into various modules according to functions to be described separately. Certainly, when the present invention is implemented, the functions of the modules may be implemented in a same or multiple hardware devices.

The foregoing description of the disclosed embodiments enables persons skilled in the art to implement or use the present invention. Various modifications for these embodiments are obvious for persons skilled in the art. The general principle defined in this specification may be implemented in other embodiments without departing from the spirit or scope of the present invention. Therefore, the present invention is not limited to the embodiments shown in this specification, but conforms to the widest scope consistent with the principle and novel features disclosed in the specification.

What is claimed is:

1. A method for a virtual private cloud to access a network, comprising:
    creating a Virtual Private Cloud (VPC) and a Virtual Customer network Edge device (VCE) after receiving a VPC initial access request sent by a user, and determining a downlink port address for the VCE according to a VPC configuration resource carried in the request;
    sending a data center identifier to a network side device through a VPC access request, wherein the VPC access request is used for instructing the network side device to determine, according to the data center identifier, a Provider network Edge router (PE) used for access of the VCE at a network side, determine an interface address for the PE and determine an uplink port address for the VCE from a Virtual Private Network (VPN) configuration resource provided by the user through a data center device, allocate an access tunnel for the VCE to access the PE, and configure the PE interface address and access tunnel information to the determined PE used for access of the VCE; and
    configuring the uplink port address, the downlink port address and the access tunnel information to the VCE after receiving the uplink port address and the access tunnel information that are sent by the network side device, so that the VCE accesses the PE, thereby enabling the created VPC to access the VPN;
    allocating a VPC identifier for the created VPC, wherein the VPC access request further carries the VPC identifier;
    saving VPC creation information,
    after receiving a second VPC initial delete request sent by the user, determining the VPC creation information according to a VPC name carried in the request;
    deleting the VPC creation information and releasing resources occupied by the VPC and the VCE; and
    sending a second VPC delete request carrying one of the VPC identifier and the VPC name, and the data center identifier to the network side device, wherein the VPC identifier is determined for the VPC creation information and the second VPC delete request is used for instructing the network side device to release a connection between the VCE and the PE.

2. The method according to claim 1, further comprising:
    configuring a routing protocol according to a routing protocol parameter carried in the VPC initial access request; and
    sending the routing protocol parameter to the network side device through the VPC access request, so that the network side device configures the routing protocol according to the routing protocol parameter.

3. A data center device, comprising:
    an information receiving module comprising circuitry, configured to receive a virtual private cloud (VPC) initial access request sent by a user;
    a second creating module comprising circuitry, configured to create a VPC and a virtual customer network edge device (VCE) after the VPC initial access request is received;
    a second address allocating module comprising circuitry, configured to allocate a downlink port address for the VCE according to a VPC configuration resource carried in the VPC initial access request;
    an information sending module comprising circuitry, configured to send a VPC access request to a network side device, wherein the VPC access request carries a data center identifier;
    a resource receiving module comprising circuitry, configured to receive an uplink port address and access tunnel information that are sent by the network side device; and
    a VCE configuring module comprising circuitry, configured to configure the uplink port address, the downlink port address and the access tunnel information to the VCE;
    a second identifier allocating module comprising circuitry, configured to allocate a VPC identifier for the created VPC, wherein the VPC access request further comprises the VPC identifier;
    wherein the information receiving module is further configured to receive a second VPC initial delete request sent by the user, and the device further comprises:
    a second creation information saving module comprising circuitry, configured to save creation information of the VPC;
    a second VPC deleting module comprising circuitry, configured to determine the VPC creation information according to a VPC name carried in the second VPC initial delete request, delete the VPC creation information and release resources occupied by the VPC and the VCE; and
    a second delete request sending module comprising circuitry, configured to send a second VPC delete request carrying one of the VPC name and a VPC identifier, and the data center identifier to the network side device, wherein the VPC identifier is determined by the VPC creation information.

4. The device according to claim 3, wherein the VPC initial access request further carries a routing protocol parameter, and the device further comprises:
    a third routing configuring module comprising a circuitry, configured to configure a routing protocol according to the routing protocol parameter carried in the VPC initial access request.

* * * * *